United States Patent
Schaaf et al.

(10) Patent No.: US 10,329,030 B2
(45) Date of Patent: Jun. 25, 2019

(54) CONDUCTIVE RADIUS FILLER SYSTEM AND METHOD

(71) Applicant: The Boeing Company, Chicago, IL (US)

(72) Inventors: America O. Schaaf, Seattle, WA (US); Elise Rae E. Castorina, Shoreline, WA (US); Gabriel Z. Forston, Lake Stevens, WA (US); Patrice K. Ackerman, Kent, WA (US)

(73) Assignee: The Boeing Company, Chicago, IL (US)

( * ) Notice: Subject to any disclaimer, the term of this patent is extended or adjusted under 35 U.S.C. 154(b) by 701 days.

(21) Appl. No.: 15/061,942

(22) Filed: Mar. 4, 2016

(65) Prior Publication Data

US 2017/0253346 A1 Sep. 7, 2017

(51) Int. Cl.
*B64D 45/02* (2006.01)
*B64C 1/00* (2006.01)
(Continued)

(52) U.S. Cl.
CPC ............ *B64D 45/02* (2013.01); *B29C 70/885* (2013.01); *B64C 1/00* (2013.01); *B64C 3/18* (2013.01);
(Continued)

(58) Field of Classification Search
CPC ........... B64C 1/06; B64C 1/062; B64C 1/064; B64C 1/065; B64C 1/068; B64C 1/069;
(Continued)

(56) References Cited

U.S. PATENT DOCUMENTS

| 2,140,672 A | * | 12/1938 | Gray | ............... B64D 37/02 114/224 |
| 4,556,591 A | * | 12/1985 | Bannink, Jr. | ......... B29C 65/601 428/43 |

(Continued)

FOREIGN PATENT DOCUMENTS

| EP | 2832645 A1 | 2/2015 |
| EP | 2902179 A2 | 8/2015 |
| WO | 99/51494 A1 | 10/1999 |

OTHER PUBLICATIONS

Extended European Search Report, dated Jun. 16, 2017, for Counterpart EP Application No. 17158523.5, Applicant The Boeing Company, 7 pages.

*Primary Examiner* — Tien Q Dinh
*Assistant Examiner* — Alexander V. Giczy

(57) ABSTRACT

There is provided a conductive radius filler system and method. The system has a composite assembly with one or more composite structures having one or more radius filler regions. The system further has one or more conductive radius fillers filling the one or more radius filler regions. Each of the conductive radius fillers has a conductive element of electrically conductive material. The system further has one or more conductive radius filler connections connecting the conductive radius fillers to one of, a fastener system, a fuel tank system, and a current generating system, to form one or more current handling systems of the system. The one or more current handling systems provide one of, edge glow mitigation of edge glow as a secondary effect of lightning strikes, electrostatic discharge mitigation of electrostatic discharge caused by refueling electrification and fuel slosh, and current return handling to provide a minimized dedicated conductive system.

21 Claims, 19 Drawing Sheets

(51) Int. Cl.
  *B64C 3/18*   (2006.01)
  *B64F 5/10*   (2017.01)
  *B29C 70/88*  (2006.01)

(52) U.S. Cl.
  CPC ........ *B64F 5/10* (2017.01); *B64C 2001/0072* (2013.01); *Y02T 50/43* (2013.01)

(58) Field of Classification Search
  CPC .......... B64C 3/18; B64D 45/02; B64D 37/02; B64D 37/32; Y10T 428/24174; H05F 3/00; H05F 7/00; B60R 16/06; B29C 70/885; B64F 5/10
  See application file for complete search history.

(56) References Cited

U.S. PATENT DOCUMENTS

| | | | | |
|---|---|---|---|---|
| 4,789,594 A * | 12/1988 | Stawski | ............... | B26D 1/02 |
| | | | | 156/222 |
| 4,920,449 A * | 4/1990 | Covey | ............... | H05F 3/02 |
| | | | | 244/1 A |
| 5,499,782 A * | 3/1996 | Domine | ............... | B32B 5/28 |
| | | | | 244/1 A |
| 5,761,022 A * | 6/1998 | Rankilor | ............... | H05F 3/00 |
| | | | | 361/214 |
| 5,789,061 A * | 8/1998 | Campbell | ............... | B29C 65/564 |
| | | | | 156/73.1 |
| 5,833,786 A * | 11/1998 | McCarville | ............... | B64C 1/06 |
| | | | | 156/92 |
| 6,284,175 B1 * | 9/2001 | Luippold | ............... | B29C 70/882 |
| | | | | 264/105 |
| 6,320,118 B1 * | 11/2001 | Pridham | ............... | B29C 65/4855 |
| | | | | 174/2 |
| 6,562,436 B2 * | 5/2003 | George | ............... | B32B 5/12 |
| | | | | 428/105 |
| 6,709,538 B2 | 3/2004 | George et al. | | |
| 7,413,694 B2 * | 8/2008 | Waldrop, III | ......... | B29C 70/443 |
| | | | | 264/102 |
| 7,541,083 B2 * | 6/2009 | Grose | ............... | B29C 65/527 |
| | | | | 244/131 |
| 8,453,971 B2 * | 6/2013 | Robb | ............... | B64C 1/068 |
| | | | | 244/119 |
| 2005/0213278 A1 * | 9/2005 | Hawley | ............... | B64D 45/02 |
| | | | | 361/212 |
| 2008/0144249 A1 | 6/2008 | Rawlings | | |
| 2009/0317587 A1 * | 12/2009 | Deobald | ............... | B29C 70/865 |
| | | | | 428/119 |
| 2010/0140834 A1 * | 6/2010 | Sherwood | ............... | B05C 17/0103 |
| | | | | 264/211.12 |
| 2010/0213312 A1 * | 8/2010 | Robb | ............... | B64C 1/068 |
| | | | | 244/1 A |
| 2010/0276536 A1 * | 11/2010 | Lambert | ............... | B64D 45/02 |
| | | | | 244/1 A |
| 2011/0139932 A1 * | 6/2011 | Matheson | ............... | B64C 3/182 |
| | | | | 244/132 |
| 2011/0297790 A1 * | 12/2011 | Yamaguchi | ............... | B64C 3/34 |
| | | | | 244/135 R |
| 2012/0074265 A1 * | 3/2012 | Hallander | ............... | B29C 66/112 |
| | | | | 244/90 R |
| 2012/0234977 A1 * | 9/2012 | Kawahara | ............... | B64C 3/34 |
| | | | | 244/131 |
| 2012/0291285 A1 * | 11/2012 | Kamaraj | ............... | B29C 70/34 |
| | | | | 29/897.2 |
| 2012/0315431 A1 * | 12/2012 | Cetiner | ............... | B64C 1/061 |
| | | | | 428/81 |
| 2014/0117022 A1 * | 5/2014 | Ackerman | ............... | B29C 66/114 |
| | | | | 220/562 |
| 2015/0125655 A1 | 5/2015 | Kajita et al. | | |
| 2015/0144737 A1 * | 5/2015 | Garcia Martin | ...... | B29C 70/865 |
| | | | | 244/123.14 |
| 2015/0360396 A1 * | 12/2015 | Thomas | ............... | B29C 39/10 |
| | | | | 428/221 |
| 2015/0367619 A1 | 12/2015 | Butler et al. | | |
| 2016/0244182 A1 * | 8/2016 | Kawashima | ............... | B64D 37/32 |

* cited by examiner

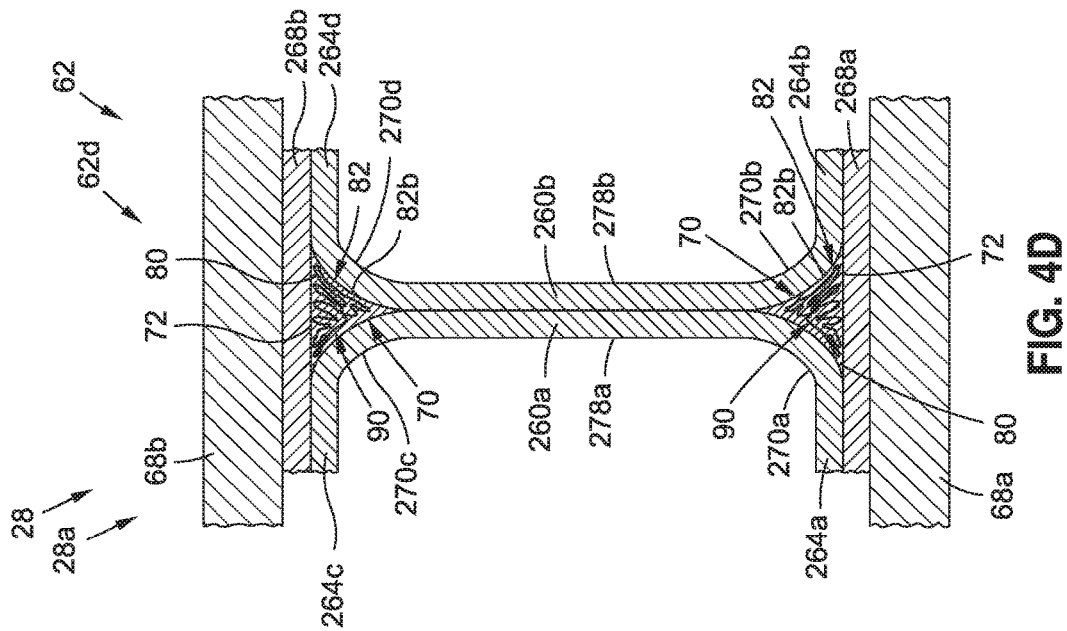
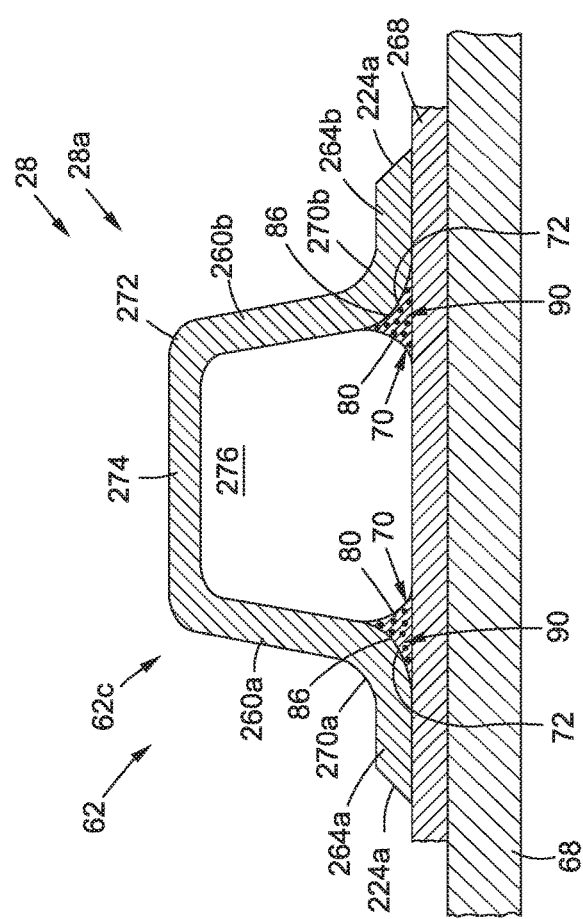
FIG. 4D
FIG. 4C

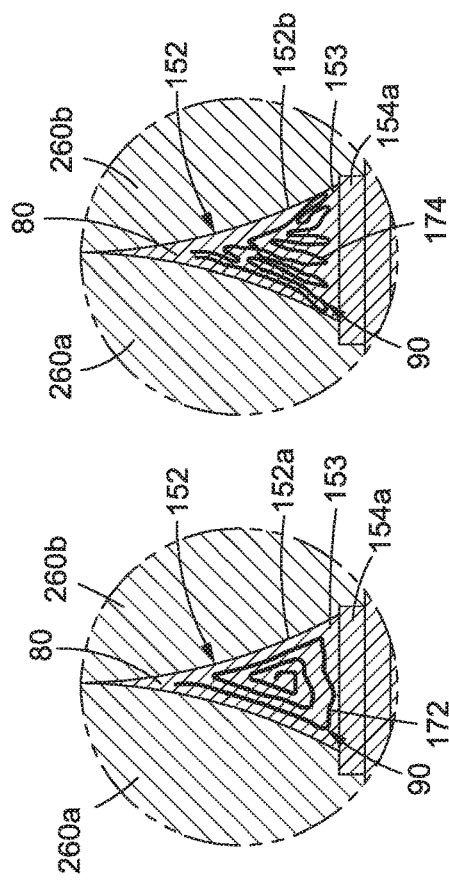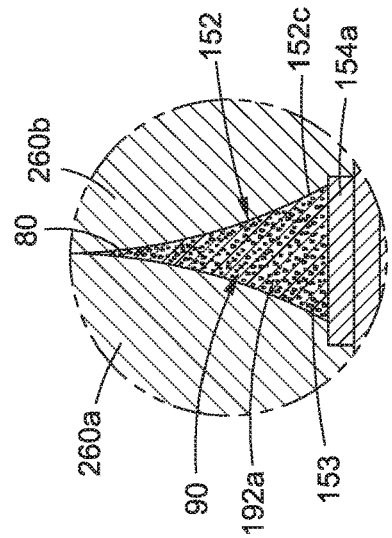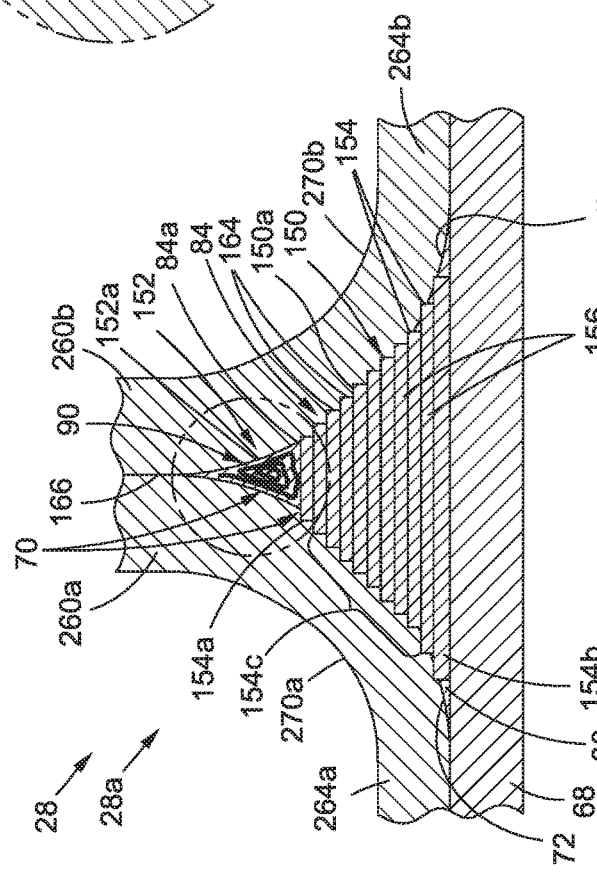

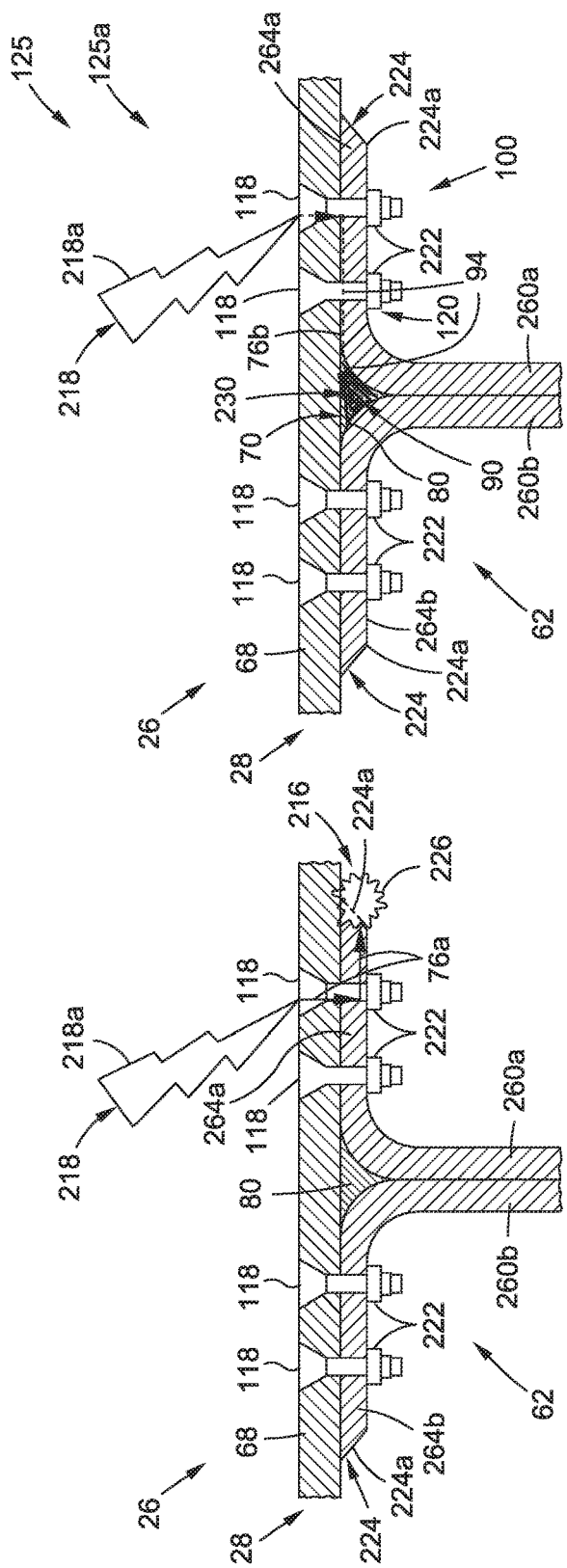

CONDUCTIVE RADIUS FILLER SYSTEM AND METHOD

BACKGROUND

1) Field of the Disclosure

The disclosure relates generally to composite structures and systems with radius fillers, and more specifically, to aircraft composite structures and systems with conductive radius filler systems to facilitate electrical conductivity, and methods of making the same.

2) Description of Related Art

Aircraft wings and fuselage structures have typically been made of metal materials which provide electrical conductivity and a current return to carry functional and fault currents and to handle electrostatic dissipation. Composite materials are increasingly being used in the manufacture of aircraft wings and fuselage structures, due to their high strength-to-weight ratios, corrosion resistance, and other favorable properties, and to improve performance and reduce the weight of the aircraft.

For example, aircraft wings may be formed of composite stiffened panel structures comprising composite wing skin panels, to which reinforcing stringers or stiffeners, spars, and ribs may be attached to improve the strength, stiffness, buckling resistance, and stability of the composite wing skin panels. Gaps or void regions may be formed by the radius of each curved piece of the reinforcing stringers, such as blade or T-shaped stringers, I-shaped stringers, J-shaped stringers, or other types of stringers, when they are attached or joined perpendicularly to composite wing skin panels. Radius fillers or "noodles" made of composite material and having a generally triangular cross-section may be used to fill the radius filler regions or noodle regions in order to provide additional structural reinforcement to such regions.

However, composite materials used to make composite aircraft wings, fuselage, or other aircraft structures, including composite radius fillers, typically have low or no electrical conductivity. Good electrical contact between composite aircraft wings, fuselage, or other aircraft structures, and metal fasteners used in such composite aircraft wings, fuselage, or other aircraft structures, is important to provide electrical conductivity and static dissipation, such as in the event of a lightning strike or other electrical event, and to provide adequate current return and current flow pathways.

Known dedicated conductive systems consisting of metal wires or similar metal structures may be added to composite aircraft wings, fuselage, and other aircraft structures to provide electrical conductivity and a current return. However, such known dedicated conductive systems may be heavy (i.e., hundreds of pounds of metal wires) and may add weight to the aircraft. Increased weight of an aircraft, for example, may result in increased fuel consumption, which, in turn, may result in increased fuel costs. In addition, such known dedicated conductive systems may be complex and difficult to install, which, in turn, may result in increased manufacturing time and increased labor costs.

Moreover, composite aircraft wings or other aircraft structures may include internal composite stringers, spars, and ribs that may have trimmed or cut edges. Gaps along such trimmed or cut edges, where composite wing skin panels meet the internal composite stringers, spars, and ribs, may be susceptible to "edge glow", which is a plasma ejection or highly excited particle emission or ejection or spraying out of electrons at the trimmed or cut edges, resulting as a secondary effect of a lightning strike. Such edge glow may result in plasma ejection and may be a potential ignition source in fuel tanks or other areas within the aircraft composite wing.

Known systems and methods exist to prevent or mitigate edge glow in composite aircraft wings and other aircraft structures. Such known systems and methods include the application of sealants to cover the trimmed or cut edges of the internal composite stringers, spars, and ribs, and to cover metallic features, such as metal fasteners, on the aircraft composite wings. In addition, such known systems and methods include the use of fastener cap seals to cover metallic features, such as metal fasteners, on the composite aircraft wings or other aircraft structures.

However, such known sealants and fastener seal caps may be numerous in number and may add weight to the aircraft, which may result in increased fuel consumption, and, in turn, may result in increased fuel costs. Moreover, such known sealants and fastener seal caps may be time consuming and labor intensive to apply to the aircraft composite wings or other aircraft structures, which, in turn, may result in increased manufacturing time and increased labor costs.

Further, composite materials of aircraft composite wings may build up a charge from friction produced on the exterior of such aircraft composite wings, from refueling electrification, and from fuel sloshing in the fuel tanks of such aircraft composite wings. If electrical contact between the aircraft composite wings and metal fasteners in the aircraft composite wings is inadequate, the current from a lightning strike may not dissipate, may remain in the vicinity of a struck fastener and may be conducted into the substructure and possibly the fuel tank, where electrostatic discharge or sparking may occur, leading to a potential ignition source.

Known systems and methods exist to prevent or mitigate electrostatic discharge in aircraft composite wing fuel tanks and other aircraft composite structures. Such known systems and methods include the application of sealants and the use of fastener cap seals to cover metallic features, such as metal fasteners, in the aircraft composite wing fuel tanks to contain the electrostatic discharge in the fastened joint and prevent it from escaping into the fuel tank or other aircraft composite structures.

However, such known sealants and fastener seal caps may be numerous in number and may add weight to the aircraft, which may result in increased fuel consumption, and, in turn, may result in increased fuel costs. Moreover, such known sealants and fastener seal caps may be time consuming and labor intensive to apply to the aircraft composite wings or other aircraft structures, which, in turn, may result in increased manufacturing time and increased labor costs.

Accordingly, it is desirable to have and there is a need in the art for aircraft composite structures and systems with radius filler systems to facilitate electrical conductivity, and methods of making the same, that provide advantages over known structures, systems, and methods.

SUMMARY

This need for composite structures having reduced area radius fillers and methods of forming the same is satisfied. As discussed in the below detailed description, embodiments of the composite structures having reduced area radius fillers and methods of forming the same may provide significant advantages over known structures and methods.

In one embodiment of the disclosure, there is provided a conductive radius filler system. The conductive radius filler system comprises a composite assembly comprising one or more composite structures having one or more radius filler regions. The conductive radius filler system further comprises one or more conductive radius fillers filling the one or more radius filler regions. Each of the conductive radius fillers has a conductive element comprising electrically conductive material.

The conductive radius filler system further comprises one or more over-arching systems connected to the one or more conductive radius fillers, via one or more conductive radius filler connections, forming one or more current handling systems of the conductive radius filler system. The one or more current handling systems comprise one or more of an edge glow handling system configured to handle edge glow, a static dissipation handling system configured to handle static dissipation, and a current return handling system configured to handle current return.

In another embodiment of the disclosure, there is provided a conductive radius filler system for an aircraft. The conductive radius filler system comprises an aircraft composite assembly comprising one or more composite structures. The one or more composite structures comprise at least one composite wing with a plurality of stringers and a plurality of spars forming one or more radius filler regions.

The conductive radius filler system further comprises one or more conductive radius fillers filling the one or more radius filler regions. Each of the conductive radius fillers has a conductive element comprising electrically conductive material.

The conductive radius filler system further comprises one or more over-arching systems in the aircraft. The one or more over-arching systems comprise one or more of a fastener system, a fuel tank system, and a current generating system. The one or more over-arching systems are connected to the one or more conductive radius fillers, via one or more conductive radius filler connections, forming one or more current handling systems of the conductive radius filler system for the aircraft. The one or more current handling systems comprise one or more of an edge glow handling system configured to handle edge glow, a static dissipation handling system configured to handle static dissipation, and a current return handling system configured to handle current return.

In another embodiment of the disclosure, there is provided a method of making and using a conductive radius filler system for a composite assembly of an air vehicle. The method comprises the step of adding a conductive element comprising electrically conductive material to one or more radius fillers, to obtain one or more conductive radius fillers.

The method further comprises the step of installing the one or more conductive radius fillers into one or more radius filler regions formed in a composite structure of the composite assembly of the air vehicle. The method further comprises the step of connecting the one or more conductive radius fillers to one or more over-arching systems in the air vehicle, via one or more conductive radius filler connections, to form one or more current handling systems. The one or more current handling systems comprise one or more of an edge glow handling system, a static dissipation handling system, and a current return handling system.

The method further comprises the step of using the one or more current handling systems to handle one or more of edge glow, static dissipation, and current return, in the composite assembly of the air vehicle.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 4C is an illustration of a partial front sectional view of a composite structure in the form of a hat stringer having an embodiment of a conductive radius filler of the disclosure;

FIG. 4D is an illustration of a partial front sectional view of a composite structure in the form of an I-shaped stringer having an embodiment of a conductive radius filler of the disclosure;

FIG. 6A is an illustration of an enlarged front sectional view of an exemplary embodiment of a laminated radius filler that may be used in an embodiment of the conductive radius filler system of the disclosure;

FIG. 6B is an illustration of an enlarged front sectional view of an exemplary embodiment of a tip portion in the form of a unidirectional rolled tip that may be used in the laminated radius filler of FIG. 6A;

FIG. 6C is an illustration of an enlarged front sectional view of an exemplary embodiment of a tip portion in the form of a unidirectional pultruded tip that may be used in the laminated radius filler of FIG. 6A;

FIG. 6D is an illustration of an enlarged sectional view of an exemplary embodiment of a tip portion in the form of a metallic tip or a homogeneous tip that may be used in the laminated radius filler of FIG. 6A;

FIG. 9A is an illustration of a known radius filler in a stringer, and shows a lightning strike and edge glow;

FIG. 9B is an illustration of an edge glow handling system with a conductive radius filler connected to a fastener system in the stringer of FIG. 9A, and shows a redirected current pathway through the conductive radius filler;

Each figure shown in this disclosure shows a variation of an aspect of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
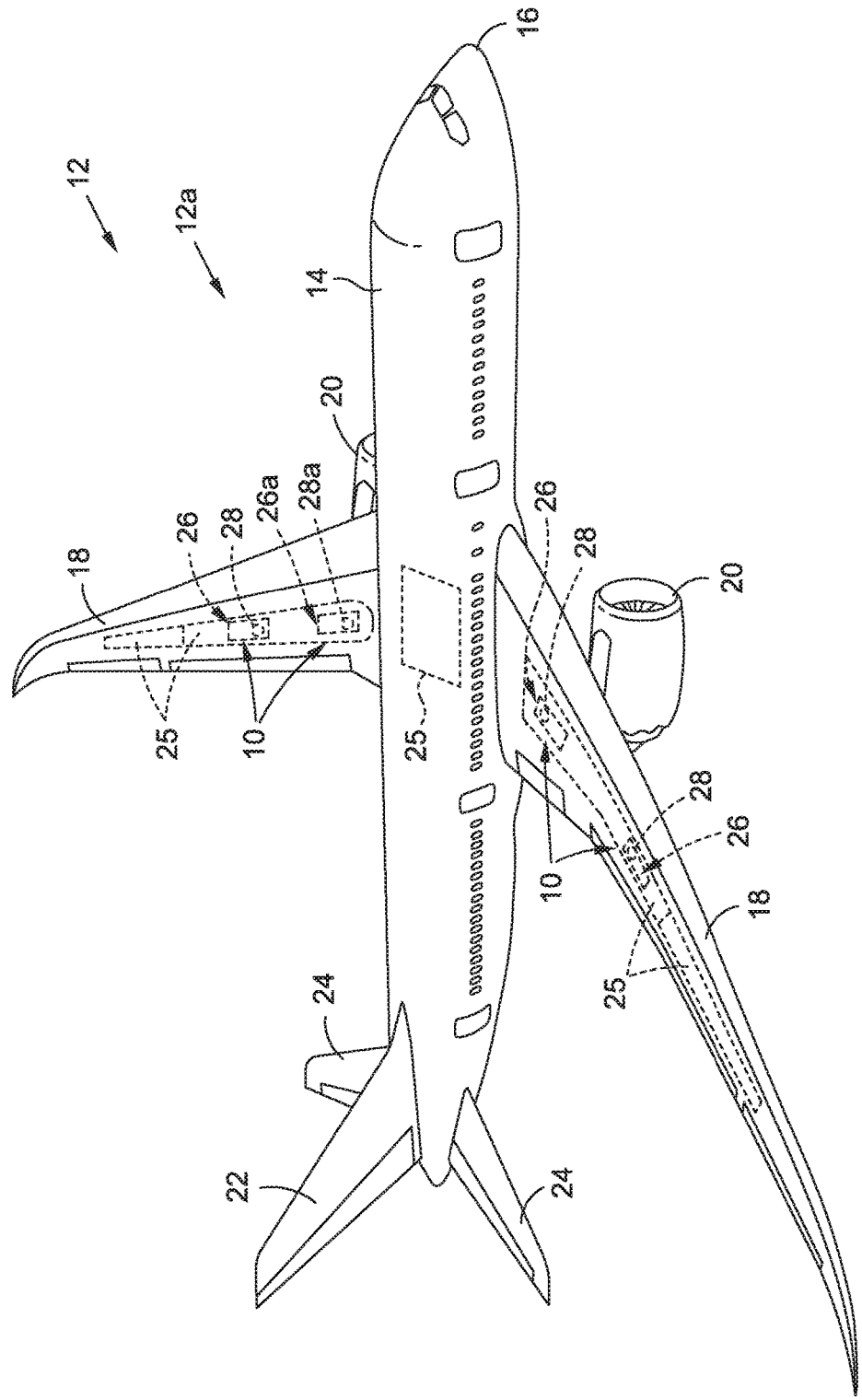
FIG. 1 is an illustration of a perspective view of an air vehicle incorporating an embodiment of a conductive radius filler system of the disclosure.

Now referring to the Figures, FIG. 1 is an illustration of a perspective view of an air vehicle 12, such as in the form of an aircraft 12a, incorporating an embodiment of a conductive radius filler system 10 of the disclosure. As shown in FIG. 1, the air vehicle 12, such as in the form of aircraft 12a, comprises a fuselage 14, a nose 16, wings 18, engines 20, a vertical stabilizer 22, and horizontal stabilizers 24. As further shown in FIG. 1, the wings 18 and fuselage 14 may comprise one or more fuel tanks 25.

The conductive radius filler system 10 (see FIG. 1) comprises a composite assembly 26 (see FIG. 1), such as an aircraft composite assembly 26a (see FIG. 1). The composite assembly 26 (see FIG. 1) comprises one or more composite structures 28 (see FIG. 1), such as aircraft composite structures 28a (see FIG. 1). In an exemplary embodiment, the composite structures 28 (see FIGS. 1, 3A) comprise aircraft composite structure 28a (see FIGS. 1, 3A). In other embodiments (not shown), the composite structures may comprise rotorcraft composite structures on a rotorcraft, spacecraft composite structures on a spacecraft, watercraft composite structures on a watercraft, or other suitable composite structures that may be used with the conductive radius filler system 10 of the disclosure.

Figure 2A:
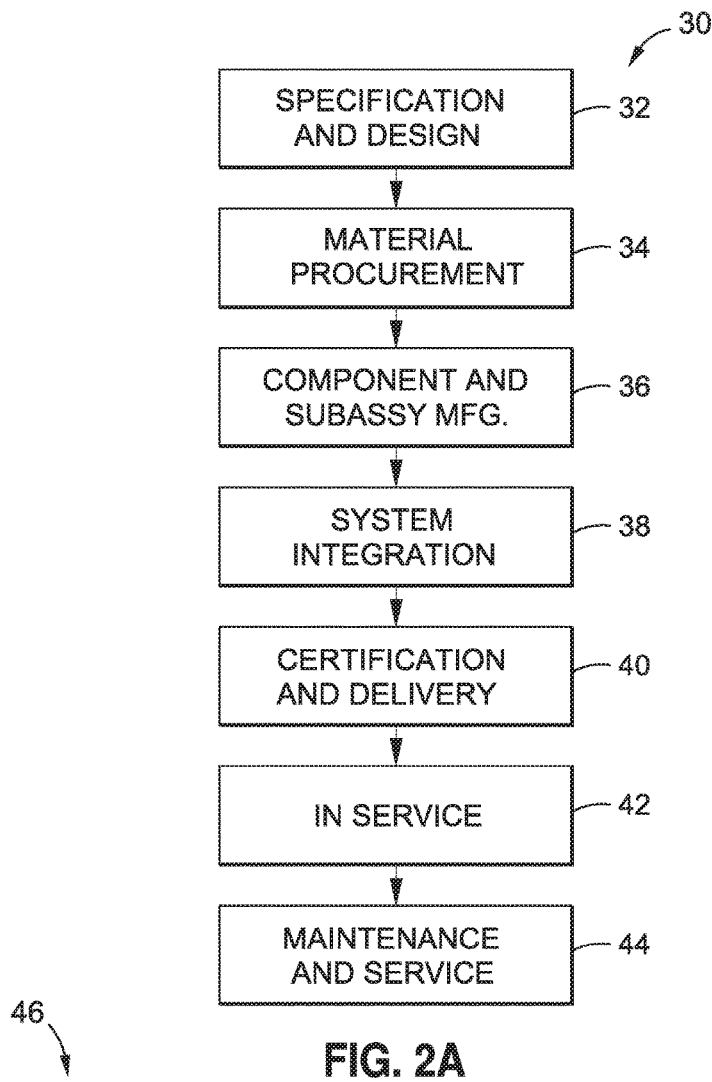
FIG. 2A is an illustration of a flow diagram of an embodiment of an aircraft manufacturing and service method.
Figure 2B:
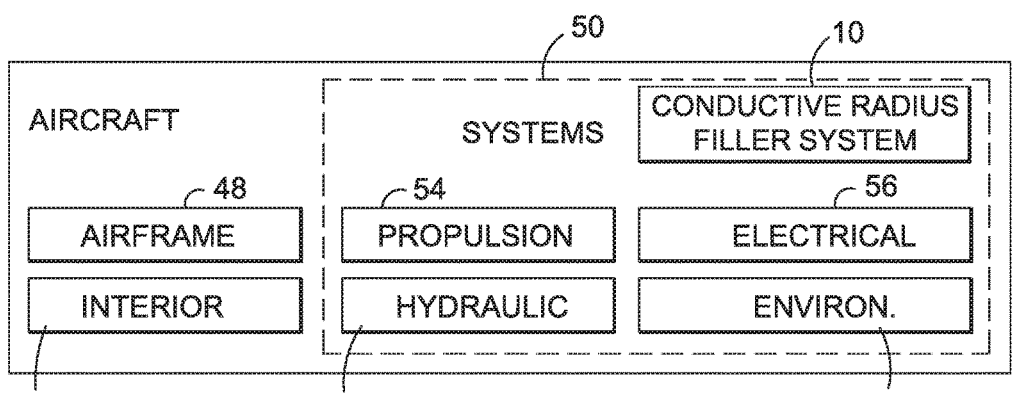
FIG. 2B is an illustration of a functional block diagram of an embodiment of an aircraft.

Now referring to FIGS. 2A-2B, FIG. 2A is an illustration of a flow diagram of an embodiment of an aircraft manufacturing and service method 30, and FIG. 2B is an illustration of a functional block diagram of an embodiment of an aircraft 46. Referring to FIGS. 2A-2B, embodiments of the disclosure may be described in the context of the aircraft manufacturing and service method 30, as shown in FIG. 2A, and the aircraft 46, as shown in FIG. 2B. During pre-production, the exemplary aircraft manufacturing and service method 30 (see FIG. 2A) may include specification and design 32 (see FIG. 2A) of the aircraft 46 (see FIG. 2B) and material procurement 34 (see FIG. 2A). During manufacturing, component and subassembly manufacturing 36 (see FIG. 2A) and system integration 38 (see FIG. 2A) of the aircraft 46 (see FIG. 2B) takes place. Thereafter, the aircraft 46 (see FIG. 2B) may go through certification and delivery 40 (see FIG. 2A) in order to be placed in service 42 (see FIG. 2A). While in service 42 (see FIG. 2A) by a customer, the aircraft 46 (see FIG. 2B) may be scheduled for routine maintenance and service 44 (see FIG. 2A), which may also include modification, reconfiguration, refurbishment, and other suitable services.

Each of the processes of the aircraft manufacturing and service method 30 (see FIG. 2A) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 2B, the aircraft 46 produced by the exemplary aircraft manufacturing and service method 30 may include an airframe 48 with a plurality of systems 50 and an interior 52. As further shown in FIG. 2B, examples of the systems 50 may include one or more of a propulsion system 54, an electrical system 56, a hydraulic system 58, and an environmental system 60. As further shown in FIG. 2B, the systems 50 may include exemplary embodiments of the conductive radius filler system 10 of the disclosure. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2A). For example, components or subassemblies corresponding to component and subassembly manufacturing 36 (see FIG. 2A) may be fabricated or manufactured in a manner similar to components or subassemblies produced while the aircraft 46 (see FIG. 2B) is in service 42 (see FIG. 2A). Also, one or more apparatus embodiments, method embodiments, or a combination thereof, may be utilized during component and subassembly manufacturing 36 (see FIG. 2A) and system integration 38 (see FIG. 2A), for example, by substantially expediting assembly of or reducing the cost of the aircraft 46 (see FIG. 2B). Similarly, one or more of apparatus embodiments, method embodiments, or a combination thereof, may be utilized while the aircraft 46 (see FIG. 2B) is in service 42 (see FIG. 2A), for example and without limitation, to maintenance and service 44 (see FIG. 2A).

Figure 3A:
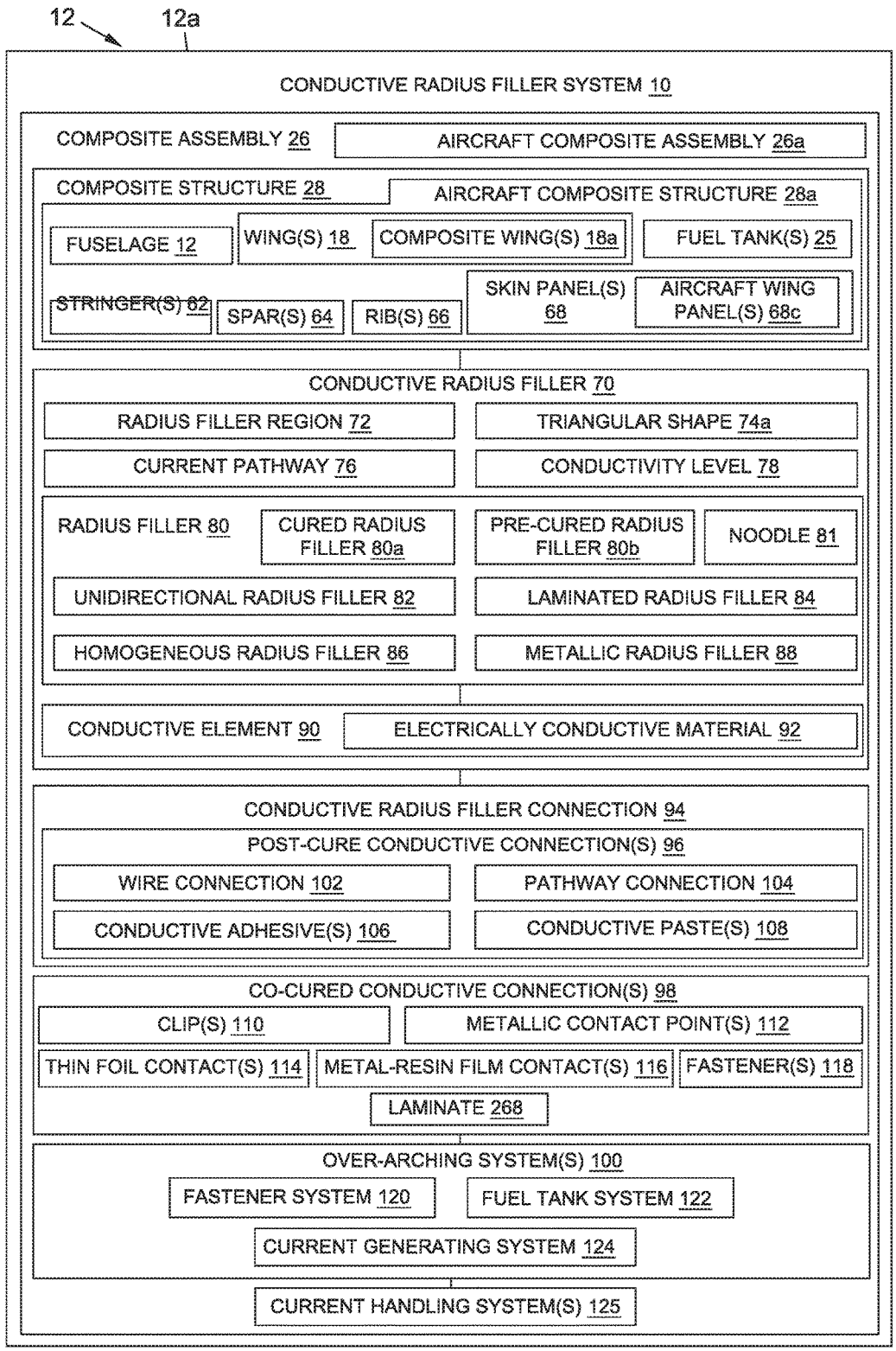
FIG. 3A is an illustration of a functional block diagram of exemplary embodiments of a conductive radius filler system of the disclosure.

Now referring to FIG. 3A, FIG. 3A is an illustration of a functional block diagram of exemplary embodiments of the conductive radius filler system 10 of the disclosure. As shown in FIG. 3A, the conductive radius filler system 10 comprises the composite assembly 26, such as the aircraft composite assembly 26*a*. The composite assembly 26 (see FIG. 3A) comprises one or more composite structures 28 (see FIG. 3A), such as one or more aircraft composite structures 28*a* (see FIG. 3A). As shown in FIG. 3A, the one or more composite structures 28, such as aircraft composite structures 28*a*, may comprise the fuselage 14, the wings 18, such as composite wings 18*a*, the fuel tanks 25, wing structures such as stringers 62, spars 64, ribs 66, and skin panels 68, or other suitable composite structures 28, such as aircraft composite structures 28*a*.

Figure 4B:
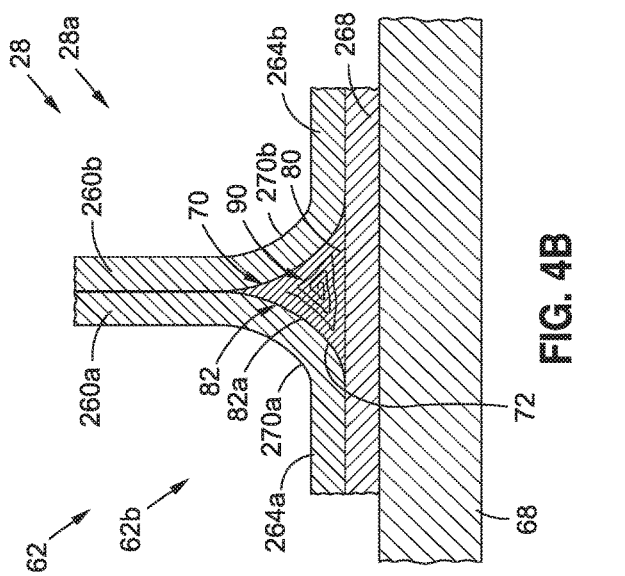
FIG. 4B is an illustration of a partial front sectional view of a composite structure in the form of a blade stringer having an embodiment of a conductive radius filler of the disclosure.
Figure 4A:
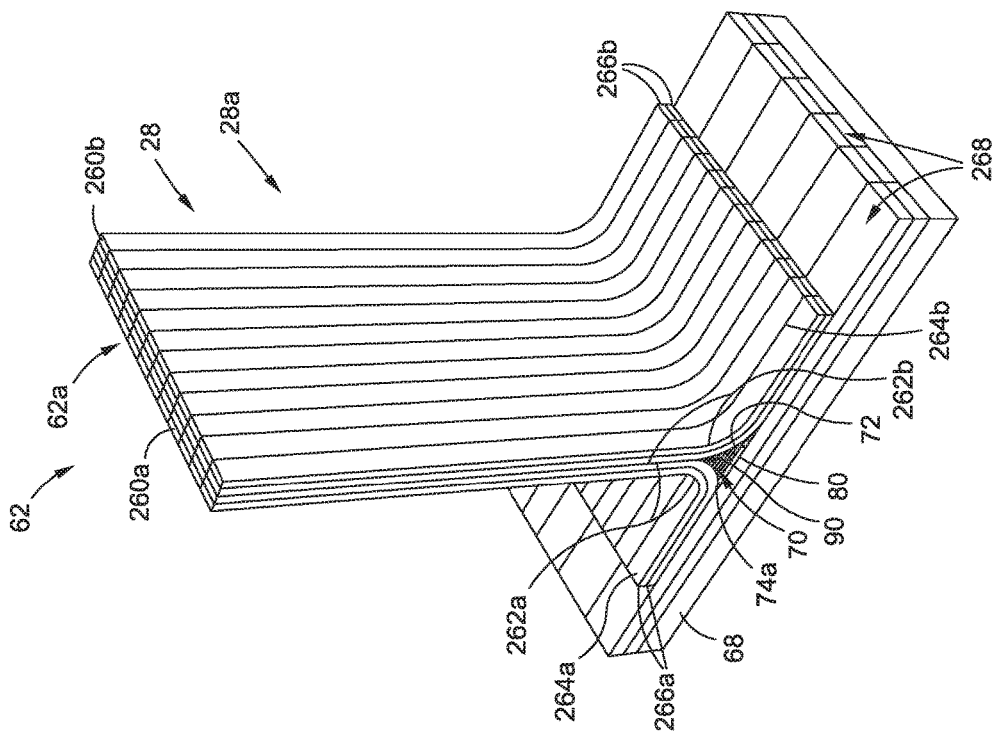
FIG. 4A is an illustration of a perspective view of a composite structure in the form of a blade stringer having an embodiment of a conductive radius filler of the disclosure.

One or more radius filler regions 72 (see FIGS. 3A, 4A) may be formed in the composite structures 28 (see FIGS. 3A, 4A). For example, the stringers 62 and spars 64 may form one or more radius filler regions 72 (see FIGS. 3A, 4A). The stringers 62 (see FIG. 3A), spars 64 (see FIG. 3A), and ribs 66 (see FIG. 3A), may be used to stiffen the skin panels 68*a* (see FIG. 3A) of the wings 16 (see FIG. 3A) of the air vehicle 12 (see FIG. 1), such as the aircraft 12*a* (see FIG. 1). Various types of stringers 62 (see FIGS. 3A, 4A-4D) that may be used in the conductive radius filler system 10 (see FIG. 3A) are discussed in further detail below with respect to FIGS. 4A-4D. The radius filler region 70 may have a generally triangular shape 74*a* (see FIGS. 3A, 4A) or another suitable shape.

As shown in FIG. 3A, the conductive radius filler system 10 further comprises one or more conductive radius fillers 70 configured to fill, and filling, the one or more radius filler regions 72. Each of the one or more conductive radius fillers 70 (see FIG. 3A) comprises a conductive element 90 (see FIG. 3A) comprising electrically conductive material 92 (see FIG. 3A). The conductive element 90 (see FIG. 3A) comprising the electrically conductive material 92 (see FIG. 3A) is added to a radius filler 80 (see FIG. 3A) to obtain the conductive radius filler 70 (see FIG. 3A). The conductive radius filler 70 (see FIG. 3A), such as the radius filler 80 (see FIG. 3A) having the conductive element 90 (see FIG. 3A), may also be referred to as a noodle 81 (see FIG. 3A).

The radius filler 80 (see FIG. 3A) may be non-conductive or substantially non-conductive, and the amount of conductivity that is imparted to the radius filler 80 (see FIG. 3A) by the conductive element 90 (see FIG. 3A) added to the radius filler 80 (see FIG. 3A) depends on the type of conductive element 90 (see FIG. 3A) and electrically conductive material 92 (see FIG. 3A) used, and a conductivity level 78 (see FIG. 3A) that may be required for a particular aircraft system. The one or more conductive radius fillers 70 (see FIG. 3A) each have a current pathway 76 (see FIG. 3A), discussed in further detail below with respect to FIGS. 9B, 10B, 11B, and 12B.

As shown in FIG. 3A, the radius filler 80 may comprise one of a unidirectional radius filler 82, a laminated radius filler 84, a homogeneous radius filler 86, a metallic radius filler 88, or another suitable type of radius filler 80. Each of these types of radius fillers 80 (see FIG. 3A) is discussed in further detail below with respect to FIGS. 3B-3D.

As shown in FIG. 3A, the conductive radius filler system 70 further comprises one or more conductive radius filler connections 94. The one or more conductive radius filler connections 94 (see FIG. 3A) connect the one or more conductive radius fillers 70 (see FIG. 3A) to one or more over-arching systems 100 (see FIG. 3A), to form, or forming, one or more current handling systems 125 (see FIG. 3A). The resulting networks of current handling systems 125 (see FIG. 3A) are configured to handle one or more of edge glow 216 (see FIG. 3F), static dissipation 232 (see FIG. 3F), and current return 244 (see FIG. 3F), and are discussed in further detail below with respect to FIG. 3F.

As shown in FIG. 3A, the one or more conductive radius filler connections 94 may comprise one or more post-cure conductive connections 96, one or more co-cured conductive connections 98, or another suitable conductive connection. The one or more post-cure conductive connections 96 (see FIG. 3A) may comprise a wire connection 102 (see FIG. 3A) or a pathway connection 104 (see FIG. 3A) connected to a cured radius filler 80*a* (see FIG. 3A), after trim, with conductive adhesive(s) 106 (see FIG. 3A), conductive paste(s) 108 (see FIG. 3A), or another suitable conductive material.

The one or more post-cure conductive connections 96 (see FIG. 3A) may comprise one or more clip(s) 110 (see FIG. 3A) or one or more metallic contact point(s) 112 (see FIG. 3A) added to or coupled to a pre-cured radius filler 80*b* (see FIG. 3A) and then co-cured into the radius filler 80 (see 3A) to allow for connection or attachment after cure, or post cure. For low level current 228*b* (see FIG. 3F), thin foil contacts 114 (see FIG. 3A), metal-resin film contacts 116 (see FIG. 3A), or another suitable metallic contact point 112 (see FIG. 3A) may be co-cured into a laminate 268 (see FIGS. 3A, 4A) adjacent the conductive radius filler 70 (see FIG. 3A), where the thin foil contacts 114 (see FIG. 3A) or the metal-resin film contacts 116 (see FIG. 3A) contact both the conductive radius filler 70 (see FIG. 3A) and intersect one or more fasteners 118 (see FIG. 3A).

As shown in FIG. 3A, the one or more over-arching systems 100 of the conductive radius filler system 10 preferably comprise one or more of a fastener system 120, a fuel tank system 122, a current generating system 124, or another suitable over-arching system 100. The fastener system 120 (see FIG. 3A) may comprise a plurality of fasteners 118 (see FIGS. 3A, 3F, 9B) that may be connected to the one or more conductive radius fillers 70 (see FIG. 3A) to handle edge glow 216 (see FIG. 3F), such as minimizing or preventing edge glow 216 (see FIG. 3F). The fuel tank system 122 (see FIG. 3A) may comprise a fuel tank 25 (see FIGS. 3A, 3F) with one or more fuel tank surfaces 25*a* (see FIG. 3F) that may be connected to the one or more conductive radius fillers 70 (see FIG. 3A) to handle static dissipation 232 (see FIG. 3F), such as minimizing or preventing electrostatic discharge 234 (see FIG. 3F) or static buildup. The current generating system 124 (see FIG. 3A) may comprise a current source 218 (see FIG. 3F) that delivers current 228 (see FIG. 3F) to one or more electronic systems 248 (see FIG. 3F) in the aircraft 12a (see FIGS. 3A, 3F) to handle current return 244 (see FIG. 3F).

Figure 3B:
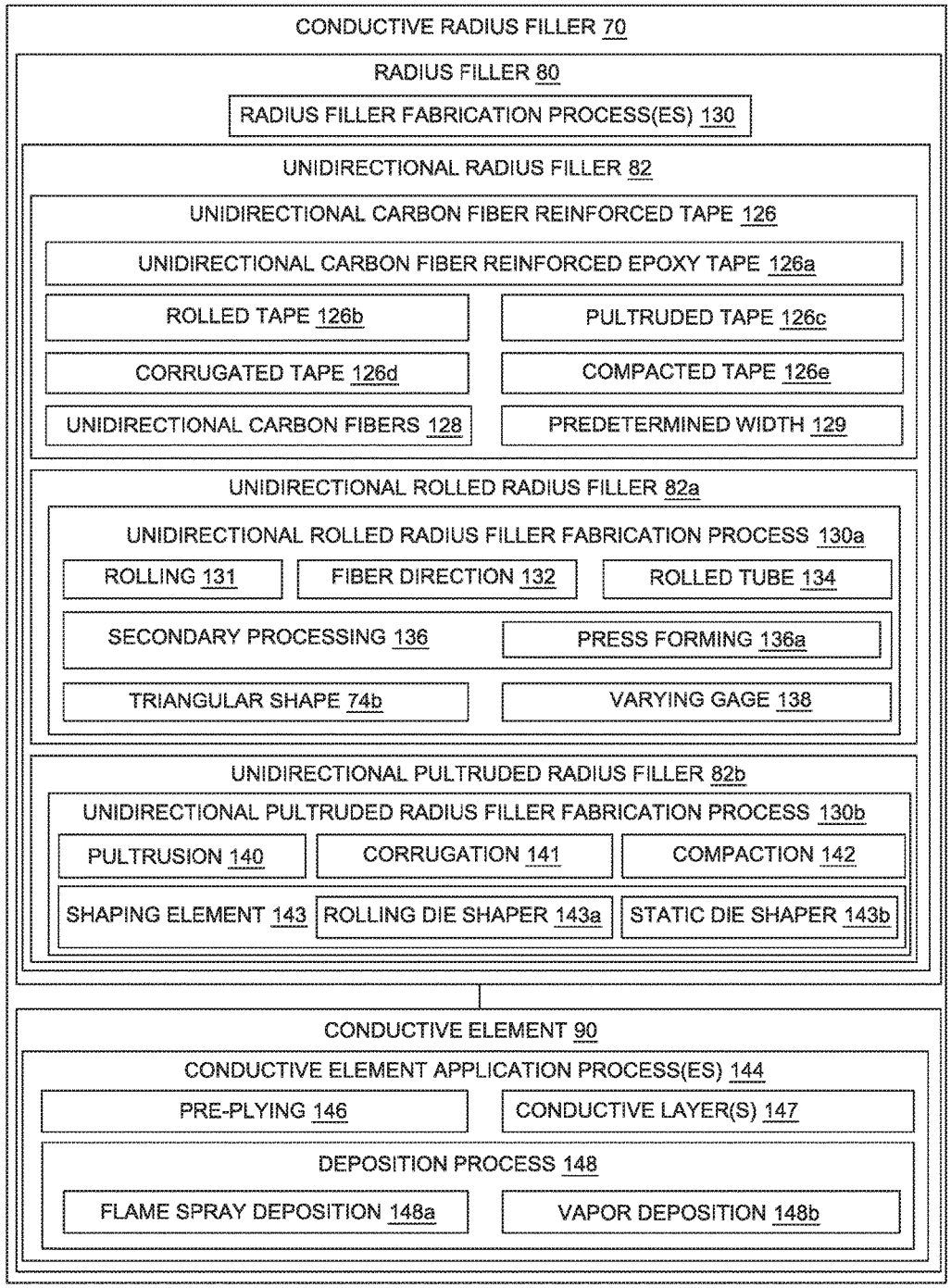
FIG. 3B is an illustration of a functional block diagram of exemplary embodiments of unidirectional radius fillers that may be used in embodiments of the conductive radius filler of the conductive radius filler system of the disclosure.

Now referring to FIG. 3B, FIG. 3B is an illustration of a functional block diagram of exemplary embodiments of radius fillers 80, in the form of unidirectional radius fillers 82, that may be used in embodiments of the conductive radius filler 70 of the conductive radius filler system 10 (see FIG. 3A) of the disclosure. As shown in FIG. 3B, the unidirectional radius filler 82 may comprise one of a unidirectional rolled radius filler 82a, a unidirectional pultruded radius filler 82b, or another suitable unidirectional radius filler 82.

As shown in FIG. 3B, the unidirectional radius filler 82 may comprise unidirectional carbon fiber reinforced tape 126, such as unidirectional carbon fiber reinforced prepreg tape 126a or another suitable unidirectional carbon fiber reinforced tape 126, and may be made of unidirectional carbon fibers 128 and may have a predetermined width 129.

The radius filler 80 (see FIG. 3B), such as the unidirectional radius filler 82 (see FIG. 3B), may be fabricated or formed via one or more radius filler fabrication process(es) 130 (see FIG. 3B). For example, the unidirectional radius fillers 82 (see FIG. 3B) may be fabricated by rolling 131 (see FIG. 3B), pultrusion 140 (see FIG. 3B), or another suitable radius filler fabrication process 130 (see FIG. 3B). The conductive element 90 (see FIG. 3B) may be added to the unidirectional radius filler 82 (see FIG. 3B) via one or more conductive element application process(es) 144 (see FIG. 3B).

As shown in FIG. 3B, the unidirectional rolled radius filler 82a may be fabricated or formed via a unidirectional rolled radius filler fabrication process 130a, such as in the form of rolling 131, for example, hand rolling. The predetermined widths 129 (see FIG. 3B) of the unidirectional carbon fiber reinforced tape 126 (see FIG. 3B), such as the unidirectional carbon fiber reinforced prepreg tape 126a (see FIG. 3B), may be hand rolled along a fiber direction 132 (see FIG. 3B) until tightly packed into a rolled tube 134 (see FIG. 3B) or cylindrical tube.

In one conductive element application process 144 (see FIG. 3B), the conductive element 90 (see FIG. 3B) may be added to the unidirectional rolled radius filler 82a (see FIG. 3B) via pre-plying 146 (see FIG. 3B) one or more conductive layers 147 (see FIG. 3B) onto the unidirectional carbon fiber reinforced tape 126 (see FIG. 3B), such as the unidirectional carbon fiber reinforced prepreg tape 126a (see FIG. 3B), before rolling 131 (see FIG. 3B). In another conductive element application process 144 (see FIG. 3B), the one or more conductive layers 147 (see FIG. 3B) may be hand rolled with the unidirectional carbon fiber reinforced tape 126 (see FIG. 3B), such as the unidirectional carbon fiber reinforced prepreg tape 126a (see FIG. 3B).

Secondary processing 136 (see FIG. 3B), such as press forming 136a (see FIG. 3B), may be used to form the rolled tube 134 (see FIG. 3B), with the conductive element 90 (see FIG. 3B), such as the one or more conductive layers 147 (see FIG. 3B), into a generally triangular shape 74b (see FIG. 3B) that fills the radius filler region 72 (see FIGS. 3A, 5A), and substantially matches the generally triangular shape 74a (see FIGS. 3A, 4A) of the radius filler region 72 (see FIGS. 3A, 4A). The conductive radius filler 70 (see FIG. 3B) comprising the unidirectional rolled radius filler 82a (see FIG. 3B) with the conductive element 90 (see FIG. 3B) may also be formed into another suitable shape to fill the radius filler region 72 (see FIG. 3A) and match the shape of the radius filler region 72 (see FIG. 3A).

The predetermined width 129 (see FIG. 3B) of the unidirectional carbon fiber reinforced tape 126 (see FIG. 3B), such as the unidirectional carbon fiber reinforced prepreg tape 126a (see FIG. 3B), used for rolling 131 (see FIG. 3B) may be tapered along the length in order to create radius fillers 80 (see FIG. 3B), such as unidirectional rolled radius fillers 82a (see FIG. 3B), of varying gage 138 (see FIG. 3B).

As shown in FIG. 3B, the unidirectional pultruded radius filler 82b may be fabricated or formed via a unidirectional pultruded radius filler fabrication process 130b, such as in the form of pultrusion 140. The unidirectional pultruded radius fillers 82b (see FIG. 3B) may undergo pultrusion 140 (see FIG. 3B) with corrugation 141 (see FIG. 3B) or compaction 142 (see FIG. 3B) of the unidirectional carbon fiber reinforced tape 126 (see FIG. 3B), such as the unidirectional carbon fiber reinforced prepreg tape 126a (see FIG. 3B), down to a desired or appropriate cross-sectional area. This may be accomplished with a shaping element 143 (see FIG. 3B), such as in the form of a rolling die shaper 143a (see FIG. 3B), a static die shaper 143b (see FIG. 3B), or another suitable shaping element 143 (see FIG. 3B), that shapes or forms the unidirectional pultruded radius filler 82b (see FIG. 3B) into a generally triangular shape 74b (see FIG. 3B) to fill the radius filler region 72 (see FIGS. 3A, 5A), and substantially match the generally triangular shape 74a (see FIGS. 3A, 4A) of the radius filler region 72 (see FIGS. 3A, 4A). The conductive radius filler 70 (see FIG. 3B) comprising the unidirectional pultruded radius filler 82a (see FIG. 3B) with the conductive element 90 (see FIG. 3B) may also be formed into another suitable shape to fill the radius filler region 72 (see FIG. 3A) and match the shape of the radius filler region 72 (see FIG. 3A).

In one conductive element application process 144 (see FIG. 3B), the conductive element 90 (see FIG. 3B) may be added to the unidirectional pultruded radius filler 82b (see FIG. 3B) via pre-plying 146 (see FIG. 3B) one or more conductive layers 147 (see FIG. 3B) onto the unidirectional carbon fiber reinforced tape 126 (see FIG. 3B), such as the unidirectional carbon fiber reinforced prepreg tape 126a (see FIG. 3B), before pultrusion 140 (see FIG. 3B). In another conductive element application process 144 (see FIG. 3B), the one or more conductive layers 147 (see FIG. 3B) may be pultruded with the unidirectional carbon fiber reinforced tape 126 (see FIG. 3B), such as the unidirectional carbon fiber reinforced prepreg tape 126a (see FIG. 3B).

Conductive elements 90 (see FIG. 3B), such as conductive foils 174 (see FIG. 3E), for example, thin metal foils 174a (see FIG. 3E), and conductive films 204 (see FIG. 3E), for example, conductive resin films 204a (see FIG. 3E), are particularly suitable for the conductive element application processes 144 (see FIG. 3B), discussed above, including pre-plying 146 (see FIG. 3B) the one or more conductive layers 147 (see FIG. 3B) onto the unidirectional carbon fiber reinforced tapes 126 (see FIG. 3B), and rolling 131 (see FIG. 3B) or pultrusion 140 (see FIG. 3B) of the one or more conductive layers 147 (see FIG. 3B) with the unidirectional carbon fiber reinforced tapes 126 (see FIG. 3B).

As shown in FIG. 3B, the conductive element application process 144 (see FIG. 3B) may further include a deposition process 148, such as a flame spray deposition 148a, a vapor deposition 148b, or another suitable deposition process 148. For example, conductive elements 90 (see FIG. 3B), such as in the form of conductive metal materials 192 (see FIG. 3E), may be deposited onto the unidirectional carbon fiber reinforced tape 126 (see FIG. 3B), such as the unidirectional carbon fiber reinforced prepreg tape 126a (see FIG. 3B), via flame spray deposition 148a or vapor deposition 148b.

Figure 3C:
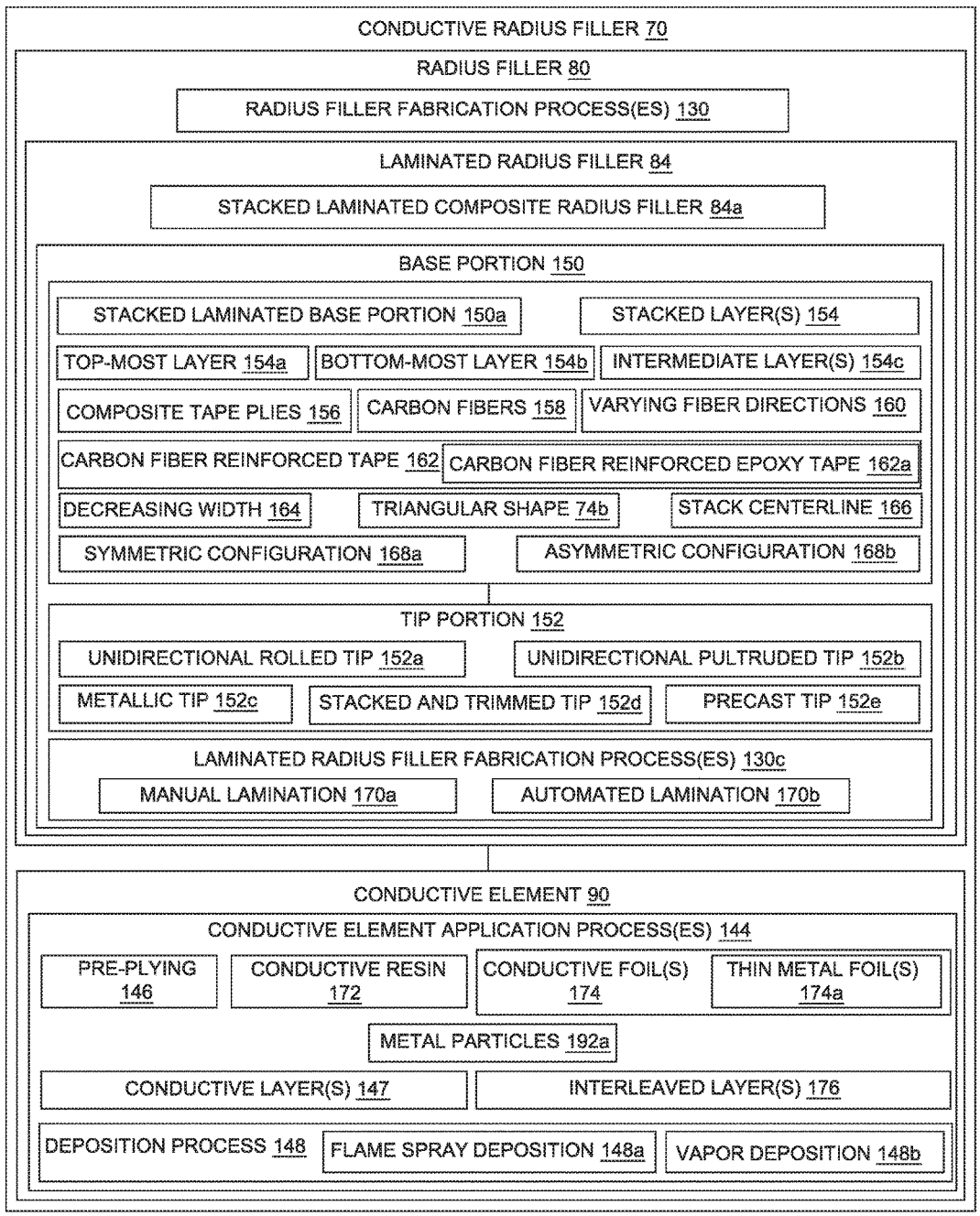
FIG. 3C is an illustration of a functional block diagram of exemplary embodiments of laminated radius fillers that may be used in embodiments of the conductive radius filler of the conductive radius filler system of the disclosure.

Referring now to FIG. 3C, FIG. 3C is an illustration of a functional block diagram of exemplary embodiments of laminated radius fillers 84 that may be used in embodiments of the conductive radius filler 70 of the conductive radius filler system 10 (see FIG. 3A) of the disclosure. As shown in FIG. 3C, the laminated radius filler 84, such as in the form of a stacked laminated composite radius filler 84a, may comprise a base portion 150, such as a stacked laminated base portion 150a, and may comprise a tip portion 152.

As shown in FIG. 3C, the base portion 150, such as the stacked laminated base portion 150a, may comprise one or more stacked layer(s) 154, for example, stacked sequences. The one or more stacked layers(s) 154 (see FIG. 3C) may comprise a top-most layer 154a (see FIG. 3C), a bottom-most layer 154b (see FIG. 3C), and one or more intermediate layer(s) 154c (see FIG. 3C) in between the top-most layer 154a (see FIG. 3C) and the bottom-most layer 154b (see FIG. 3C).

The one or more stacked layer(s) 154 (see FIG. 3C) of the base portion 150 (see FIG. 3C), such as the stacked laminated base portion 150a (see FIG. 3C), may comprise any quantity of composite tape plies 156 (see FIG. 3C) made of carbon fibers 158 (see FIG. 3C) of varying fiber directions 160 (see FIG. 3C). The composite tape plies 156 (see FIG. 3C) of the one or more stacked layer(s) 154 (see FIG. 3C) may comprise carbon fiber reinforced tape 162 (see FIG. 3C), such as in the form of carbon fiber reinforced epoxy tape 162a (see FIG. 3C), or another suitable carbon fiber reinforced tape 162 (see FIG. 3C).

The composite tape plies 156 (see FIG. 3C) may be formed from a reinforcement material surrounded by and supported within a matrix material, such as for example, a prepreg material. The reinforcement material may comprise high-strength fibers, such as glass or carbon fibers, graphite, aromatic polyamide fiber, fiberglass, or another suitable reinforcement material. The matrix material may comprise various polymer or resin materials, such as epoxy, polyester, vinyl ester resins, polyetheretherketone polymer (PEEK), polyetherketoneketone polymer (PEKK), bismaleimide, or another suitable matrix material. As used herein, "prepreg" means a woven or braided fabric or cloth-like tape material, e.g., fiberglass or carbon fibers, that have been impregnated with an uncured or partially cured resin, which is flexible enough to be formed into a desired shape, then "cured," e.g., by the application of heat in an oven or an autoclave, to harden the resin into a strong, rigid, fiber-reinforced structure. The composite tape plies 156 (see FIG. 3C) may further be in the form of a prepreg unidirectional tape, a unidirectional fiber tape, a carbon fiber-reinforced plastic (CFRP) tape, or another suitable tape; a carbon fiber-reinforced plastic (CFRP) fabric, a prepreg fabric, a woven fabric including a woven carbon fiber fabric, or another suitable fabric; a combination of a tape or a fabric thereof; or another suitable composite material. The radius filler 80 (see FIG. 3C), such as the laminated radius filler 84 (see FIG. 3C), may be made of similar resin and fiber material used to form components in the composite assembly 26 (see FIG. 3A), such as the composite structure 28 (see FIG. 3A), the stringers 62 (see FIG. 3A), the spars 64 (see FIG. 3A), the skin panels 68 (see FIG. 3A), and other components.

The one or more stacked layer(s) 154 (see FIG. 3C), for example, stacked sequences, that form the base portion 150 (see FIG. 3C) are preferably made of carbon fiber reinforced tape 162 (see FIG. 3C), such as carbon fiber reinforced epoxy tape 162a (see FIG. 3C), of a decreasing width 164 (see FIG. 3C). The base portion 150 (see FIG. 3C) and the tip portion 152 (see FIG. 3C) form a generally triangular shape 74b (see FIG. 3C) that fills the radius filler region 72 (see FIGS. 3A, 5A), and substantially matches the generally triangular shape 74a (see FIGS. 3A, 4A) of the radius filler region 72 (see FIGS. 3A, 4A).

Symmetry of the laminated radius filler 84 (see FIG. 3C), such as in the form of the stacked laminated composite radius filler 84a (see FIG. 3C), is preferably controlled by a stack centerline 166 (see FIGS. 3C, 6A) of the one or more stacked layers 154 (see FIGS. 3C, 6A), thus allowing for the creation of laminated radius fillers 84 (see FIG. 3C) having a symmetric configuration 168a (see FIG. 3C), or an asymmetric configuration 168b (see FIG. 3C).

As shown in FIG. 3C, the tip portion 152 may be in the form of a unidirectional rolled tip 152a (see also FIG. 6B), a unidirectional pultruded tip 152b (see also FIG. 6C), a metallic tip 152c (see also FIG. 6D), a homogeneous tip 152d, a stacked and trimmed tip 152e, a precast tip 152f, or another suitable tip portion 152. The tip portion 152 (see FIGS. 3C, 6A) is preferably placed on the top-most layer 154a (see FIGS. 3C, 6A) or sequence of the base portion 150 (see FIGS. 3C, 6A).

The radius filler 80 (see FIG. 3C), such as the laminated radius filler 84 (see FIG. 3C), may be fabricated or formed via one or more radius filler fabrication process(es) 130 (see FIG. 3C). For example, the laminated radius fillers 84 (see FIG. 3C) may be fabricated via a laminated radius filler fabrication process 130c (see FIG. 3C), such as manual lamination 170a (see FIG. 3C), automated lamination 170b (see FIG. 3C), or another suitable radius filler fabrication process 130 (see FIG. 3C). The conductive element 90 (see FIG. 3C) may be added to the laminated radius filler 84 (see FIG. 3C) via one or more conductive element application process(es) 144 (see FIG. 3C).

The conductive element 90 (see FIG. 3C) may be added to the tip portion 152 (see FIG. 3C) and/or the base portion 150a (see FIG. 3C). For the unidirectional rolled tip 152a (see FIG. 3C) or the unidirectional pultruded tip 152b (see FIG. 3C), the conductive element 90 (see FIG. 3C) may be added with the conductive element application process 144 (see FIG. 3C) similar to the conductive element application process 144 (see FIG. 3B) for the unidirectional radius fillers 82 (see FIG. 3B), as discussed above. For example, the conductive element 90 (see FIG. 3C) may be added to the unidirectional rolled tip 152a (see FIG. 3C) or the unidirectional pultruded tip 152b (see FIG. 3C) via pre-plying 146 (see FIG. 3C) one or more conductive layers 147 (see FIG. 3C) onto the tip portion 152 (see FIG. 3C) before rolling or pultruding, or the one or more conductive layers 147 (see FIG. 3C) may be hand rolled or pultruded with the tip portion 152 (see FIG. 3C). In another conductive element application process 144 (see FIG. 3C), the one or more conductive layers 147 (see FIG. 3C) may be integrated into a precast tip 152f (see FIG. 3C). The metallic tips 152c (see FIG. 3C) preferably have conductive metal materials 192 (see FIG. 3E) in the metallic tips 152c (see FIG. 3C) and impart conductivity to the laminated radius filler 84 (see FIG. 3C).

If the conductive element 90 (see FIG. 3C) is added to the base portion 150 (see FIG. 3C), such as the stacked laminated base portion 150a (see FIG. 3C), the carbon fiber reinforced tape 162 (see FIG. 3C), such as in the form of carbon fiber reinforced epoxy tape 162a (see FIG. 3C), may be pre-plied with conductive resin 172 (see FIG. 3C), or metal particles 192a (see FIGS. 3C, 3E) may be deposited on one layer, on all layers, or on one or more interleaved layer(s) 176 (see FIG. 3C) that are interleaved between two or more layers, of the carbon fiber reinforced tape 162 (see FIG. 3C), such as in the form of carbon fiber reinforced epoxy tape 162a (see FIG. 3C), via a deposition process 148 (see FIG. 3C). The deposition process 148 (see FIG. 3C) may comprise a flame spray deposition 148a (see FIG. 3C), a vapor deposition 148b (see FIG. 3C), or another suitable deposition process 148 (see FIG. 3C).

Conductive elements 90 (see FIG. 3C), such as conductive foils 174 (see FIG. 3C), for example, thin metal foils 174a (see FIG. 3C), may also be added on the one or more interleaved layer(s) 176 (see FIG. 3C) that are interleaved between two or more layers of the carbon fiber reinforced tape 162 (see FIG. 3C), such as in the form of carbon fiber reinforced epoxy tape 162a (see FIG. 3C).

Figure 3D:
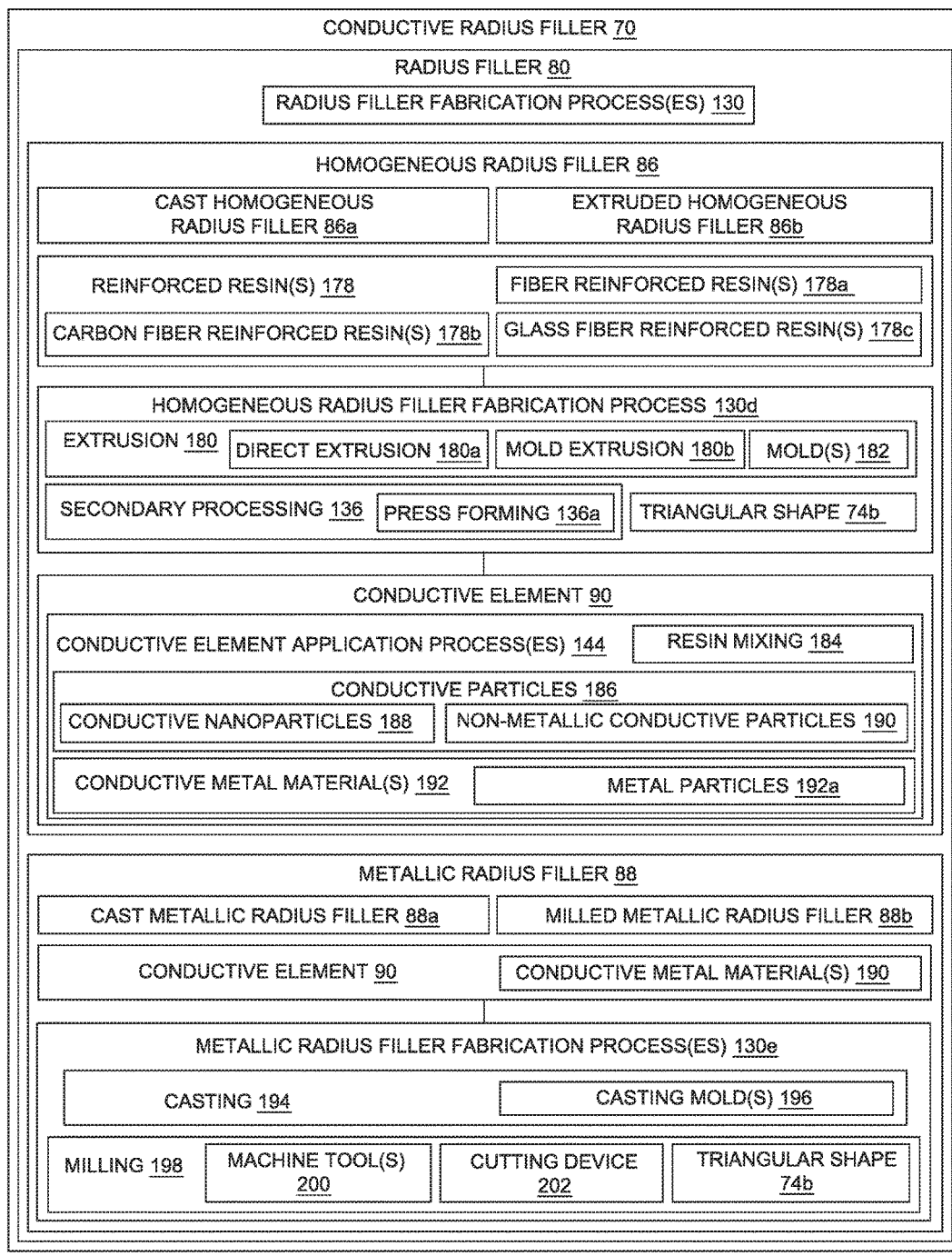
FIG. 3D is an illustration of a functional block diagram of exemplary embodiments of homogeneous radius fillers and a metallic radius fillers that may be used in embodiments of the conductive radius filler of the conductive radius filler system of the disclosure.

Now referring to FIG. 3D, FIG. 3D is an illustration of a functional block diagram of exemplary embodiments of homogeneous radius fillers 86, and metallic radius fillers 88, that may be used in embodiments of the conductive radius filler 70 of the conductive radius filler system 10 (see FIG. 3A) of the disclosure. As shown in FIG. 3D, the homogeneous radius filler 86 may comprise one of a cast homogeneous radius filler 86a, an extruded homogeneous radius filler 86b, or another suitable homogeneous radius filler 86. The homogeneous radius fillers 86, such as the cast homogeneous radius filler 86a and the extruded homogeneous radius filler 86b, are formed or pressed directly into the shape needed for application.

As shown in FIG. 3D, the homogeneous radius fillers 86 may comprise reinforced resin(s) 178, such as fiber reinforced resin(s) 178a, for example, carbon fiber reinforced resins 178b, glass fiber reinforced resins 178c, or other suitable fiber reinforced resins 178a.

The radius filler 80 (see FIG. 3D), such as the homogenous radius filler 86 (see FIG. 3D), may be fabricated or formed via one or more radius filler fabrication process(es) 130 (see FIG. 3D). For example, the homogeneous radius fillers 86 (see FIG. 3D) may be fabricated via a homogeneous radius filler fabrication process 130d (see FIG. 3D), such as casting 179 (see FIG. 3D) or extrusion 180 (see FIG. 3D). The reinforced resins 178 (see FIG. 3D) of the homogeneous radius fillers 86 (see FIG. 3D) may undergo extrusion 180 (see FIG. 3D), such as direct extrusion 180a (see FIG. 3D), directly into the radius filler region 72 (see FIG. 3A, 4A), or may undergo mold extrusion 180b (see FIG. 3D) into one or more mold(s) 182 (see FIG. 3D).

With the homogeneous radius fillers 86 (see FIG. 3D), the conductive element 90 (see FIG. 3D), such as such as conductive particles 186 (see FIG. 3D), for example, conductive nanoparticles 188 (see FIG. 3D), non-metallic conductive particles 190 (see FIG. 3D), conductive metal materials 192 (see FIG. 3D) such as metal particles 192a (see FIG. 3D), or other suitable conductive particles 186 (see FIG. 3D), may be added via the conductive element application process 144 (see FIG. 3D), such as resin mixing 184 (see FIG. 3D), directly to the reinforced resin(s) 178 (see FIG. 3D).

As shown in FIG. 3D, the one or more conductive radius fillers 70 may comprise the radius filler 80 in the form of a metallic radius filler 88 having the conductive element 90. The metallic radius filler 88 (see FIG. 3D) may comprise one of a cast metallic radius filler 88a (see FIG. 3D), a milled metallic radius filler 88b (see FIG. 3D), or another suitable metallic radius filler 88 (see FIG. 3D). The metallic radius fillers 88 (see FIG. 3D) preferably already possess a degree of conductivity, and may be cast or milled into the desired shape, such as a generally triangular shape 74b (see FIG. 3D) that fills the radius filler region 72 (see FIGS. 3A, 5A), and substantially matches the generally triangular shape 74a (see FIGS. 3A, 4A) of the radius filler region 72 (see FIGS. 3A, 4A).

The metallic radius filler 88 (see FIG. 3D) preferably has the conductive element 90 (see FIG. 3D) in the form of one or more conductive metal material(s) 190 (see FIG. 3D) or another suitable conductive element 90 (see FIG. 3D). The radius filler 80 (see FIG. 3D), such as the metallic radius filler 88 (see FIG. 3D), may be fabricated or formed via one or more radius filler fabrication process(es) 130 (see FIG. 3D). For example, the metallic radius fillers 88 (see FIG. 3D) may be fabricated via a metallic radius filler fabrication process 130e (see FIG. 3D), such as a casting 194 (see FIG. 3D) with casting molds 196 (see FIG. 3D), milling 198 with one or more machine tool(s) 200 (see FIG. 3D), such as a cutting device 202 (see FIG. 3D), or another suitable metallic radius filler fabrication process 130e (see FIG. 3D).

Figure 3E:
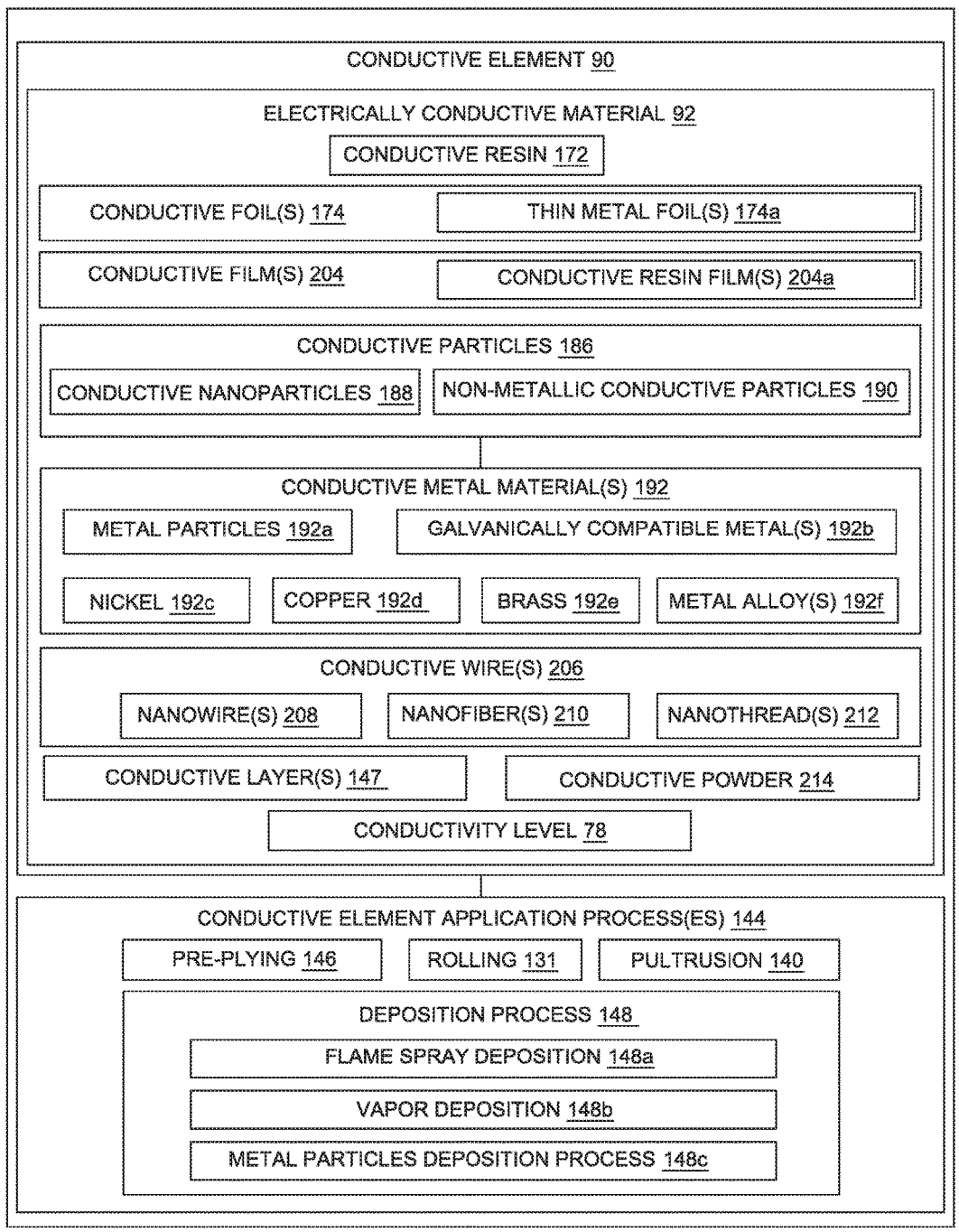
FIG. 3E is an illustration of a functional block diagram of exemplary embodiments of conductive elements that may be used in embodiments of the conductive radius filler of the conductive radius filler system of the disclosure.

Now referring to FIG. 3E, FIG. 3E is an illustration of a functional block diagram of exemplary embodiments of conductive elements 90 that may be used in embodiments of the conductive radius filler 70 (see FIG. 3A) of the conductive radius filler system 10 (see FIG. 3A) of the disclosure.

As shown in FIG. 3E, the conductive element 90 may comprise electrically conductive material 92, including conductive resin 172, one or more conductive foil(s) 174 such as one or more thin metal foil(s) 174a, one or more conductive film(s) 204, such as one or more conductive resin film(s) 204a, and/or conductive particles 186, such as conductive nanoparticles 188, non-metallic conductive particles 190, metal particles 192a, or other suitable conductive particles 186. As further shown in FIG. 3E, the conductive element 90 may comprise one or more conductive metal material(s) 192, such as the metal particles 192a, galvanically compatible metal(s) 192b, including but not limited to, nickel 192c, copper 192d, brass 192e, metal alloy(s) 192f, or another suitable conductive metal material 192.

As further shown in FIG. 3E, the conductive element 90 may comprise one or more conductive wire(s) 206, such as one or more nanowire(s) 208, one or more nanofiber(s) 210, one or more nanothread(s) 212, or another suitable conductive wire 206. The conductive element 90 (see FIG. 3E) may further comprise conductive powder 214 (see FIG. 3E), one or more conductive layer(s) 147 (see FIG. 3E), or another suitable conductive element 90 (see FIG. 3E). Preferably, the conductive element 90 (see FIG. 3E) has a suitable conductivity level 78 (see FIG. 3E).

The conductive element application process 144 (see FIG. 3E) for applying the conductive element 90 (see FIG. 3E) may comprise pre-plying 146 (see FIG. 3E), rolling 131 (see FIG. 3E), pultrusion 140 (see FIG. 3E), or a deposition process 148 (see FIG. 3E). The deposition process 148 (see FIG. 3E) may comprise flame spray deposition 148a (see FIG. 3E), vapor deposition 148b (see FIG. 3E), metal particles deposition process 148c (see FIG. 3E), or another suitable deposition process 148 (see FIG. 3E).

Figure 3F:
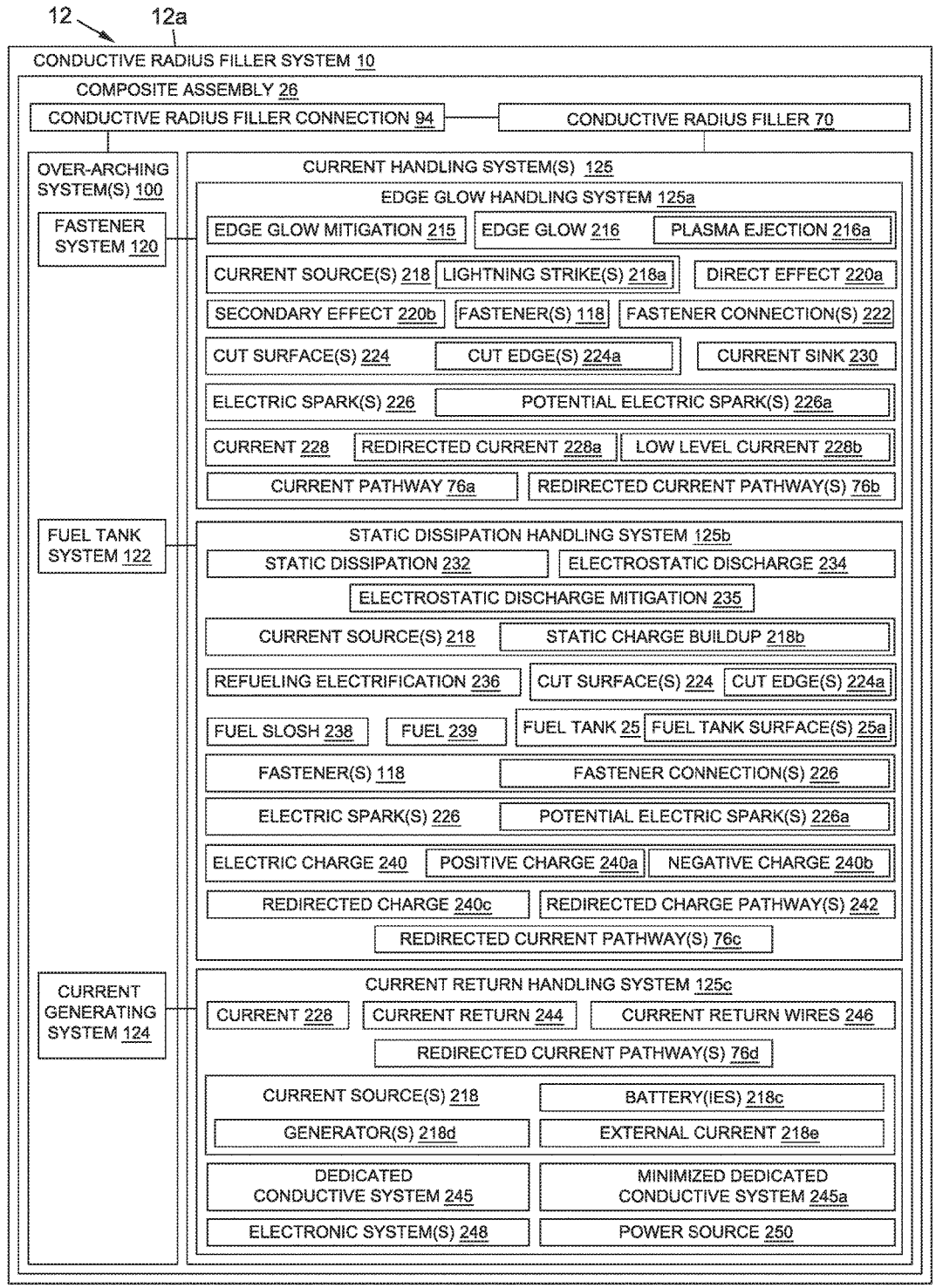
FIG. 3F is an illustration of a functional block diagram of exemplary embodiments of current handling systems of the conductive radius filler system of the disclosure.

Now referring to FIG. 3F, FIG. 3F is an illustration of a functional block diagram of exemplary embodiments of current handling systems 125 of the conductive radius filler system 10 of the disclosure. As shown in FIG. 3F, the conductive radius filler system 10 of the air vehicle 12, such as an aircraft 12a, comprises the composite assembly 26 with the conductive radius filler 70 connected to the one or more of the over-arching system(s) 100 via the conductive radius filler connection 94 to form one or more current handling systems 125.

The one or more current handling systems 125 (see FIG. 3F) may comprise one or more of an edge glow handling system 125*a* (see FIG. 3F) configured to handle edge glow 216 (see FIG. 3F), a static dissipation handling system 125*b* (see FIG. 3F) configured to handle static dissipation 232 (see FIG. 3F), a current return handling system 125*c* (see FIG. 3F) configured to handle current return 244 (see FIG. 3F), or another suitable current handling system 125 (see FIG. 3F).

As shown in FIG. 3F, the edge glow handling system 125*a* comprises one or more redirected current pathway(s) 76*b* (see also FIG. 9B), from one or more fasteners 118 of the fastener system 120, through the one or more conductive radius fillers 70, to provide edge glow mitigation 215 and to handle edge glow 216, as a secondary effect 220*b* of one or more current source(s) 218, such as one or more lightning strike(s) 218*a*. The edge glow handling system 125*a* (see FIG. 3F) is discussed in further detail below with respect to FIG. 9B.

As shown in FIG. 3F, the static dissipation handling system 125*b* comprises one or more redirected current pathway(s) 76*c* (see also FIGS. 10B, 11B) and one or more redirected charge pathway(s) 242 (see also FIGS. 10B, 11B) from one or more fuel tank surface(s) 25*a* on a fuel tank 25 of a fuel tank system 122, through the one or more conductive radius fillers 70, to handle static dissipation 232 and to provide electrostatic discharge mitigation 235 of electrostatic discharge 234 caused by refueling electrification 236 and fuel slosh 238 of fuel 239 in the fuel tank 25. The static dissipation handling system 125*b* (see FIG. 3F) is discussed in further detail below with respect to FIGS. 10B and 11B.

As shown in FIG. 3F, the current return handling system 125*c* comprises one or more redirected current pathway(s) 76*d* (see also FIG. 12B) from one or more electronic system(s) 248 of a current generating system 124 through the one or more conductive radius fillers 70, to handle current return 244 and to provide a minimized dedicated conductive system 245*a*. The current return handling system 125*c* (see FIG. 3F) is discussed in further detail below with respect to FIG. 12B.

Now referring to FIGS. 4A-4D, various embodiments of composite structures 28, in the form of stringers 62, having one or more conductive radius fillers 70, are shown. FIG. 4A is an illustration of a perspective view of a composite structure 28, such as an aircraft composite structure 28*a*, in the form of a stringer 62, such as a blade stringer 62*a*, having a radius filler region 72 filled with an embodiment of the conductive radius filler 70 of the disclosure. The radius filler region 72 (see FIG. 4A) preferably has a generally triangular shape 74*a* (see FIG. 4A). The blade stringer 62*a* (see FIG. 4A) has a generally T-shaped cross-sectional profile.

As shown in FIG. 4A, the conductive radius filler 70 comprises the radius filler 80 having the conductive element 90. As shown in FIG. 4A, the composite structure 28, such as in the form of the stringer 62, for example, the blade stringer 62*a*, may be joined to a skin panel 68. As further shown in FIG. 4A, the blade stringer 62*a* comprises vertical webs 260*a*, 260*b*. The vertical web 260*a* (see FIG. 4A) may be comprised of wrap plies 262*a* (see FIG. 4A). The vertical web 260*b* (see FIG. 4A) may be comprised of wrap plies 262*b* (see FIG. 4A). The blade stringer 62*a* (see FIG. 4A) further comprises horizontal flanges 264*a*, 264*b* (see FIG. 4A). The horizontal flange 264*a* (see FIG. 4A) may be comprised of stacked composite plies 266*a* (see FIG. 4A). The horizontal flange 264*b* (see FIG. 4A) may be comprised of stacked composite plies 266*b* (see FIG. 4A).

As further shown in FIG. 4A, the horizontal flanges 264*a*, 264*b* of the blade stringer 62*a* may be joined to one or more base laminates 268 and/or skin panels 68. The one or more base laminates 268 (see FIG. 4A) and/or skin panels 68 (see FIG. 4A) are preferably adjacent to the base of the conductive radius filler 70 (see FIG. 4A).

Now referring to FIG. 4B, FIG. 4B is an illustration of a partial front sectional view of a composite structure 28, such as an aircraft composite structure 28*a*, in the form of a stringer 62, such as a blade stringer 62*b*, having a radius filler region 72 filled with an embodiment of the conductive radius filler 70 of the disclosure. As shown in FIG. 4B, the conductive radius filler 70 comprises the radius filler 80 having the conductive element 90. The radius filler 80 (see FIG. 4B) with the conductive element 90 (see FIG. 4B) may comprise a unidirectional radius filler 82, such as a unidirectional rolled radius filler 82*a*, as discussed above with respect to FIG. 3B. As further shown in FIG. 4B, the composite structure 28, such as in the form of the stringer 62, for example, the blade stringer 62*b*, comprises vertical webs 260*a*, 260*b* and comprises horizontal flanges 264*a*, 264*b* joined to base laminate 268, which is joined to skin panel 68. FIG. 4B further shows radial web-flange transitions 270*a*, 270*b* between the vertical webs 260*a*, 260*b* and the horizontal flanges 264*a*, 264*b* and on each side of the conductive radius filler 70. The vertical web 260*a* (see FIG. 4B) transitions to the horizontal flange 264*a* (see FIG. 4B) at the radial web-flange transition 270*a* (see FIG. 4B), and the vertical web 260*b* (see FIG. 4B) transitions to the horizontal flange 264*b* (see FIG. 4B) at the radial web-flange transition 270*b* (see FIG. 4B).

Now referring to FIG. 4C, FIG. 4C is an illustration of a partial front sectional view of a composite structure 28, such as an aircraft composite structure 28*a*, in the form of a stringer 62, such as a hat stringer 62*c*, having a radius filler region 72 filled with an embodiment of the conductive radius filler 70 of the disclosure. As shown in FIG. 4C, the hat stringer 62*c* has two conductive radius fillers 70, each comprising the radius filler 80 with the conductive element 90. The radius fillers 80 (see FIG. 4C) with the conductive element 90 (see FIG. 4C) may comprise homogeneous radius fillers 86 (see FIG. 4C), as discussed above with respect to FIG. 3D.

As further shown in FIG. 4C, the composite structure 28, such as in the form of the stringer 62, for example, the hat stringer 62*c*, comprises vertical webs 260*a*, 260*b* and comprises horizontal flanges 264*a*, 264*b* joined to base laminate 268, which is joined to skin panel 68. The horizontal flanges 264*a*, 264*b* (see FIG. 4C) may each have a cut edge 224*a* (see FIG. 4C), such as an angled edge, at the end of the respective horizontal flanges 264*a*, 264*b* (see FIG. 4C). FIG. 4C further shows radial web-flange transitions 270*a*, 270*b* between the vertical webs 260*a*, 260*b* and the horizontal flanges 264*a*, 264*b*, and on the outer side of each of the conductive radius fillers 70. The vertical web 260*a* (see FIG. 4C) transitions to the horizontal flange 264*a* (see FIG. 4C) at the radial web-flange transition 270*a* (see FIG. 4C), and the vertical web 260*b* (see FIG. 4C) transitions to the horizontal flange 264*b* (see FIG. 4C) at the radial web-flange transition 270*b* (see FIG. 4C). As further shown in FIG. 4C, the hat stringer 62*c* preferably has a hat-shaped configuration 272 formed by a cap portion 274 joined between the top-most portions of each of the vertical webs 260*a*, 260*b*, and the hat stringer 62*c* further has a core portion 276 which is an open interior portion. The hat stringer 62*c* (see FIG. 4C) has a generally hat-shaped cross-sectional profile.

Now referring to FIG. 4D, FIG. 4D is an illustration of a partial front sectional view of a composite structure 28, such as an aircraft composite structure 28*a*, in the form of a stringer 62, such as an I-shaped stringer 62*d*, having a radius filler region 72 filled with an embodiment of the conductive radius filler 70 of the disclosure. As shown in FIG. 4D, the I-shaped stringer 62d has two conductive radius fillers 70, each comprising the radius filler 80 with the conductive element 90. The I-shaped stringer 62d (see FIG. D) has a generally I-shaped cross-sectional profile.

The radius fillers 80 (see FIG. 4D) each with the conductive element 90 (see FIG. 4D) may comprise a unidirectional radius filler 82 (see FIG. 4D), such as a unidirectional pultruded radius filler 82b (see FIG. 4D), as discussed above with respect to FIG. 3B. As further shown in FIG. 4D, the composite structure 28, such as in the form of the stringer 62, for example, the I-shaped stringer 62d, comprises vertical webs 260a, 260b, comprises horizontal flanges 264a, 264b joined to a lower laminate 268a or base laminate, which is joined to a lower skin panel 68a, and comprises horizontal flanges 264c, 264d joined to an upper laminate 268b, which is joined to an upper skin panel 68b. The vertical web 260a (see FIG. 4D) and horizontal flanges 264a, 264c (see FIG. 4D) form C-shaped channel 260a (see FIG. 4D) having a C-shaped cross-section, and the vertical web 260b (see FIG. 4D) and horizontal flanges 264b, 264d (see FIG. 4D) form C-shaped channel 260b (see FIG. 4D) having a C-shaped cross-section.

FIG. 4D further shows radial web-flange transitions 270a, 270b between the vertical webs 260a, 260b and the horizontal flanges 264a, 264b and on each side of the conductive radius filler 70, and radial web-flange transitions 270c, 270d between the vertical webs 260a, 260b and the horizontal flanges 264c, 264d and on each side of the conductive radius filler 70. The vertical web 260a (see FIG. 4D) transitions to the horizontal flange 264a (see FIG. 4D) at the radial web-flange transition 270a (see FIG. 4D), the vertical web 260b (see FIG. 4D) transitions to the horizontal flange 264b (see FIG. 4D) at the radial web-flange transition 270b (see FIG. 4D), the vertical web 260a (see FIG. 4D) transitions to the horizontal flange 264c (see FIG. 4D) at the radial web-flange transition 270c (see FIG. 4D), and the vertical web 260b (see FIG. 4D) transitions to the horizontal flange 264d (see FIG. 4D) at the radial web-flange transition 270d (see FIG. 4D).

Figure 5B:
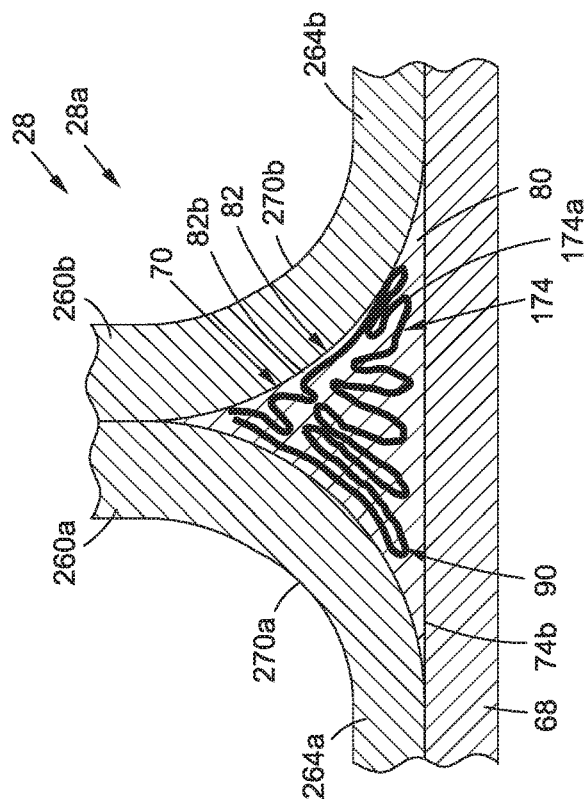
FIG. 5B is an illustration of an enlarged front sectional view of an exemplary embodiment of a unidirectional pultruded radius filler that may be used in an embodiment of the conductive radius filler system of the disclosure.
Figure 5A:
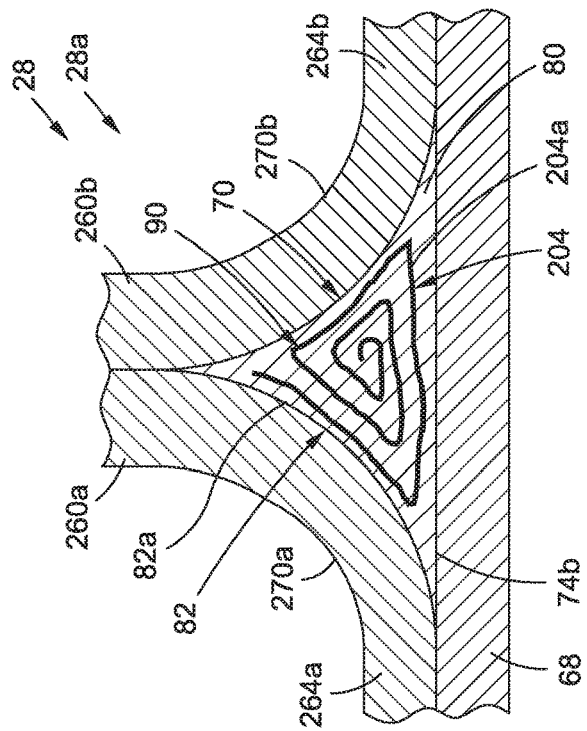
FIG. 5A is an illustration of an enlarged front sectional view of an exemplary embodiment of a unidirectional rolled radius filler that may be used in an embodiment of the conductive radius filler system of the disclosure.

Now referring to FIGS. 5A-8, various embodiments of the conductive radius fillers 70 within the composite structure 28 are shown. FIG. 5A is an illustration of an enlarged front sectional view of an exemplary embodiment of a unidirectional radius filler 82, such as a unidirectional rolled radius filler 82a, having the conductive element 90, and being positioned within the composite structure 28, such as the aircraft composite structure 28a, and that may be used in an embodiment of the conductive radius filler system 10 (see FIG. 3A) of the disclosure. As shown in FIG. 5A, the conductive radius filler 70 comprises the radius filler 80, such as in the form of unidirectional radius filler 82 (see also FIG. 3B), for example, unidirectional rolled radius filler 82a, having a generally triangular shape 74b. The conductive element 90 (see FIG. 5A) of the conductive radius filler 70 (see FIG. 5A) may comprise a conductive film 204 (see FIG. 5A), such as a conductive resin film 204a (see FIG. 5A). As further shown in FIG. 5A, the composite structure 28 comprises vertical webs 260a, 260b, radial web-flange transitions 270a, 270b, and horizontal flanges 264a, 264b. The bases of the horizontal flanges 264a, 264b (see FIG. 5A) are joined to the skin panel 68 (see FIG. 5A), and the base of the conductive radius filler 70 (see FIG. 5A) is shown adjacent the skin panel 68 (see FIG. 5A).

Now referring to FIG. 5B, FIG. 5B is an illustration of an enlarged front sectional view of an exemplary embodiment of a unidirectional radius filler 82, such as a unidirectional pultruded radius filler 82b, having the conductive element 90, and being positioned within the composite structure 28, such as the aircraft composite structure 28a, and that may be used in an embodiment of the conductive radius filler system 10 (see FIG. 3A) of the disclosure. As shown in FIG. 5B, the conductive radius filler 70 comprises the radius filler 80, such as in the form of unidirectional radius filler 82 (see also FIG. 3B), for example, unidirectional pultruded radius filler 82b, having a generally triangular shape 74b. The conductive element 90 (see FIG. 5B) of the conductive radius filler 70 (see FIG. 5B) may comprise a conductive foil 174 (see FIG. 5B), such as a thin metal foil 174a (see FIG. 5B). As further shown in FIG. 5B, the composite structure 28 comprises vertical webs 260a, 260b, radial web-flange transitions 270a, 270b, and horizontal flanges 264a, 264b. The bases of the horizontal flanges 264a, 264b (see FIG. 5B) are joined to the skin panel 68 (see FIG. 5B), and the base of the conductive radius filler 70 (see FIG. 5B) is shown adjacent the skin panel 68 (see FIG. 5B).

Now referring to FIG. 6A, FIG. 6A is an illustration of an enlarged front sectional view of an exemplary embodiment of a laminated radius filler 84, such as a stacked laminated composite radius filler 84a, having the conductive element 90, and being positioned within the composite structure 28, such as the aircraft composite structure 28a, and that may be used in an embodiment of the conductive radius filler system 10 (see FIG. 3A) of the disclosure. As shown in FIG. 6A, the laminated radius filler 84, such as in the form of a stacked laminated composite radius filler 84a, comprises a base portion 150, such as a stacked laminated base portion 150a, and comprises a tip portion 152, such as in one embodiment, a unidirectional rolled tip 152a. The base portion 150 (see FIG. 6A), such as the stacked laminated base portion 150a (see FIG. 6A), may comprise one or more stacked layer(s) 154 (see FIG. 6A), for example, stacked sequences. As shown in FIG. 6A, the one or more stacked layers(s) 154 comprises a top-most layer 154a, a bottom-most layer 154b, and one or more intermediate layer(s) 154c in between the top-most layer 154a and the bottom-most layer 154b.

The one or more stacked layer(s) 154 (see FIG. 6A) of the base portion 150 (see FIG. 6A), such as the stacked laminated base portion 150a (see FIG. 6A), comprise composite tape plies 156 (see FIG. 6A). As discussed above with respect to FIG. 3C above, the composite tape plies 156 (see FIGS. 3C. 6A) of the one or more stacked layer(s) 154 (see FIGS. 3C, 6A) may comprise carbon fiber reinforced tape 162 (see FIG. 3C), such as in the form of carbon fiber reinforced epoxy tape 162a (see FIG. 3C), or another suitable carbon fiber reinforced tape 162 (see FIG. 3C). The one or more stacked layer(s) 154 (see FIG. 6A), for example, stacked sequences, that form the base portion 150 (see FIG. 6A) preferably have a decreasing width 164 (see FIG. 6A) proceeding from the bottom-most layer 154b (see FIG. 6A) to the top-most layer 154a (see FIG. 6A). The base portion 150 (see FIG. 6A) and the tip portion 152 (see FIG. 6A) form a generally triangular shape 74b (see FIG. 6A) that fills the radius filler region 72 (see FIG. 6A), and substantially matches the generally triangular shape 74a (see FIGS. 3A, 4A) of the radius filler region 72 (see FIGS. 3A, 4A, 6A). Symmetry of the laminated radius filler 84 (see FIG. 6C), such as in the form of the stacked laminated composite radius filler 84a (see FIG. 6C), is preferably controlled by a stack centerline 166 (see FIG. 6A) of the stacked layers 154 (see FIG. 6A), thus allowing for the creation of laminated radius fillers 84 (see FIG. 6A) having a symmetric configuration 168a (see FIG. 3C), or an asymmetric configuration 168b (see FIG. 3C).

As shown in FIG. 6A, the tip portion 152 may be in the form of a unidirectional rolled tip 152a, a unidirectional pultruded tip 152b (see also FIG. 6C), a metallic tip 152c (see also FIG. 6D) or a homogeneous tip 152d (see also FIG. 3C), a stacked and trimmed tip 152e (see FIG. 3C), a precast tip 152f (see FIG. 3C), or another suitable tip portion 152. The tip portion 152 (see FIG. 6A) is preferably placed on the top-most layer 154a (see FIG. 6A) or sequence of the base portion 150 (see FIG. 6A). As shown in FIG. 6A, the tip portion 152 contains the conductive element 90. However, the base portion 150 (see FIG. 6A) may contain the conductive element 90 (see FIG. 6A) instead of, or in addition to, the tip portion 152 (see FIG. 6A). As further shown in FIG. 6A, the composite structure 28 comprises vertical webs 260a, 260b, radial web-flange transitions 270a, 270b, and horizontal flanges 264a, 264b. The bases of the horizontal flanges 264a, 264b (see FIG. 6A) are joined to the skin panel 68 (see FIG. 6A), and the base of the conductive radius filler 70 (see FIG. 6A) is shown adjacent the skin panel 68 (see FIG. 6A).

Now referring to FIG. 6B, FIG. 6B is an illustration of an enlarged front sectional view of an exemplary tip portion 152, such as in the form of a unidirectional rolled tip 152a, that may be used in the laminated radius filler 84 (see FIG. 6A), such as the stacked laminated composite radius filler 84a, of FIG. 6A. As shown in FIG. 6B, the tip portion 152, such as in the form of the unidirectional rolled tip 152a, comprises the radius filler 80 having the conductive element 90, such as in the form of conductive resin 172, or another suitable conductive element 90. A bottom 153 (see FIG. 6B) or base of the tip portion 152 (see FIG. 6B) is preferably adjacent the top-most layer 154a (see FIG. 6B) of the stacked layers 154 (see FIG. 6A), and the tip portion 152 (see FIG. 6B) is preferably surrounded on the sides by the vertical webs 260a, 260b (see FIG. 6B).

Now referring to FIG. 6C, FIG. 6C is an illustration of an enlarged front sectional view of an exemplary tip portion 152, such as in the form of a unidirectional pultruded tip 152b, that may be used in the laminated radius filler 84 (see FIG. 6A), such as the stacked laminated composite radius filler 84a, of FIG. 6A. As shown in FIG. 6C, the tip portion 152, such as in the form of the unidirectional pultruded tip 152b, comprises the radius filler 80 having the conductive element 90, such as in the form of conductive foil 174, or another suitable conductive element 90. A bottom 153 (see FIG. 6C) or base of the tip portion 152 (see FIG. 6C) is preferably adjacent the top-most layer 154a (see FIG. 6C) of the stacked layers 154 (see FIG. 6A), and the tip portion 152 (see FIG. 6C) is preferably surrounded on the sides by the vertical webs 260a, 260b (see FIG. 6C).

Now referring to FIG. 6D, FIG. 6D is an illustration of an enlarged sectional view of an exemplary tip portion 152, such as in the form of a metallic tip 152c, or a homogeneous tip 152d (see FIG. 3C), that may be used in the laminated radius filler 84 (see FIG. 6A), such as the stacked laminated composite radius filler 84a, of FIG. 6A.

As shown in FIG. 6D, the tip portion 152, such as in the form of the metallic tip 152c or homogeneous tip 152d (see FIG. 3C), comprises the radius filler 80 having the conductive element 90, such as in the form of metal particles 192a, or another suitable conductive element 90. A bottom 153 (see FIG. 6D) of the tip portion 152 (see FIG. 6D) is preferably adjacent the top-most layer 154a (see FIG. 6A) of the stacked layers 154 (see FIG. 6A), and the tip portion 152 (see FIG. 6D) is preferably surrounded on the sides by the vertical webs 260a, 260b (see FIG. 6D).

Figure 7:
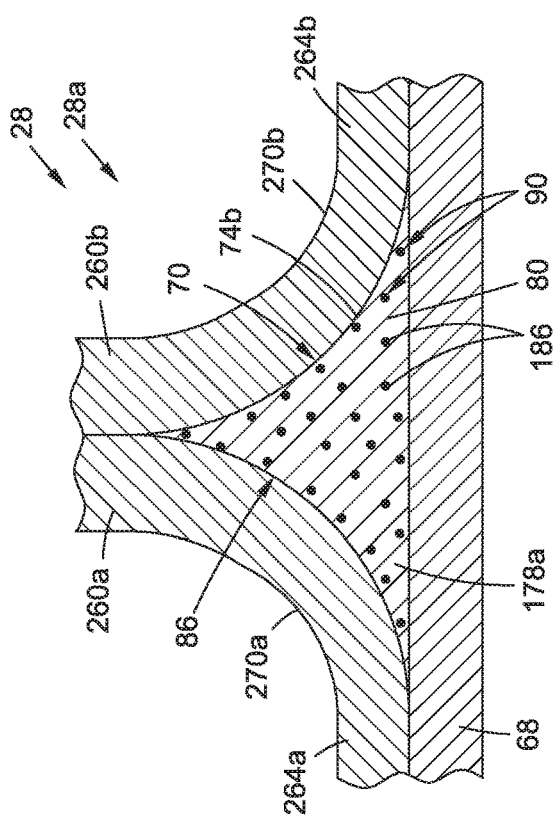
FIG. 7 is an illustration of an enlarged front sectional view of an exemplary embodiment of a homogeneous radius filler that may be used in an embodiment of the conductive radius filler system of the disclosure.

Now referring to FIG. 7, FIG. 7 is an illustration of an enlarged front sectional view of an exemplary embodiment of a homogeneous radius filler 86 having the conductive element 90, and being positioned within the composite structure 28, such as the aircraft composite structure 28a, and that may be used in an embodiment of the conductive radius filler system 10 (see FIG. 3A) of the disclosure. As shown in FIG. 7, the conductive radius filler 70 comprises the radius filler 80, such as in the form of homogeneous radius filler 86 (see also FIG. 3D), having a generally triangular shape 74b. The conductive element 90 (see FIG. 7) of the conductive radius filler 70 (see FIG. 7) may comprise a conductive particles 186 (see FIG. 7), in fiber reinforced resin 178a. As further shown in FIG. 7, the composite structure 28 comprises vertical webs 260a, 260b, radial web-flange transitions 270a, 270b, and horizontal flanges 264a, 264b. The bases of the horizontal flanges 264a, 264b (see FIG. 7) are joined to the skin panel 68 (see FIG. 7), and the base of the conductive radius filler 70 (see FIG. 7) is shown adjacent the skin panel 68 (see FIG. 7).

Figure 8:
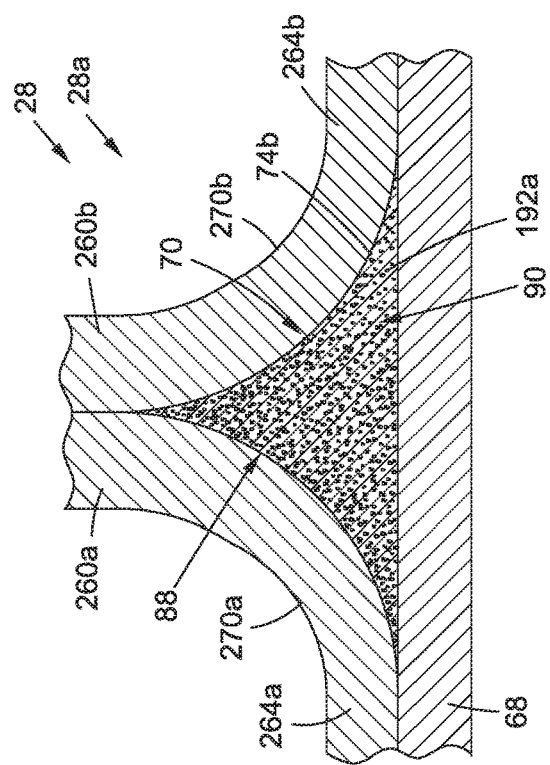
FIG. 8 is an illustration of an enlarged front sectional view of an exemplary embodiment of a metallic radius filler that may be used in an embodiment of the conductive radius filler system of the disclosure.

Now referring to FIG. 8, FIG. 8 is an illustration of an enlarged front sectional view of an exemplary embodiment of a metallic radius filler 88 having the conductive element 90, and being positioned within the composite structure 28, such as the aircraft composite structure 28a, and that may be used in an embodiment of the conductive radius filler system 10 (see FIG. 3A) of the disclosure. As shown in FIG. 8, the conductive radius filler 70 comprises the radius filler 80, such as in the form of metallic radius filler 88 (see also FIG. 3D), having a generally triangular shape 74b. The conductive element 90 (see FIG. 8) of the conductive radius filler 70 (see FIG. 8) may comprise metal particles 192a (see FIG. 8). As further shown in FIG. 8, the composite structure 28 comprises vertical webs 260a, 260b, radial web-flange transitions 270a, 270b, and horizontal flanges 264a, 264b. The bases of the horizontal flanges 264a, 264b (see FIG. 8) are joined to the skin panel 68 (see FIG. 8), and the base of the conductive radius filler 70 (see FIG. 8) is shown adjacent the skin panel 68 (see FIG. 8).

Now referring to FIG. 9A, FIG. 9A is an illustration of a known radius filler 80 in a composite structure 28, such as in the form of a stringer 62, of a composite assembly 26, and shows a current source 218, such as a lightning strike 218a, striking a fastener 118. As shown in FIG. 9A, the stringer 62 includes vertical webs 260a, 260b, horizontal flanges 264a, 264b joined to a skin panel 68, and a plurality of fasteners 118 fastening the horizontal flanges 264a, 264b to the skin panel 68 and being held in place via fastener connections 222. As shown in FIG. 9A, the horizontal flanges 264a, 264b each have a cut surface 224, such as a cut edge 224a.

As shown in FIG. 9A, when the current source 218, such as the lightning strike 218a, strikes the fastener 118, the lightning strike 218a may cause plasma ejection 216a to spray out or emit, and can be referred to as "edge glow" 216, at the cut edge 224a. As used herein, "edge glow" means a plasma ejection or highly excited particle emission or ejection or spraying out of electrons at trimmed or cut edges, resulting as a secondary effect of a lightning strike. The edge glow 216 (see FIG. 9A) is a secondary effect 220b (see FIG. 3F) of the lightning strike 218a (see FIG. 9A) rather than a direct effect 220a (see FIG. 3F). As shown in FIG. 9A, one or more current pathway(s) 76a bring current 228 (see FIG. 3F) from the current source 218 through the fastener 118 to the cut surface 224, such as the cut edge 224a, and may cause the plasma ejection 216a, or edge glow 216. For example, inside the wings 18 (see FIG. 1) of an aircraft 12a (see FIG. 1), any gaps along the cut edges 224a (see FIG.

9A) where the skin panel 68 (see FIG. 9A) meets the internal composite structure 28 (see FIG. 9A) may result in a spraying out or plasma ejection 216*a* (see FIG. 3F) in a lightning strike 218*a* (see FIG. 9A), and may, in turn, result in edge glow 216 (see FIGS. 3F, 9A).

Now referring to FIG. 9B, FIG. 9B is an illustration of a current handling system 125, such as in the form of an edge glow handling system 125*a*, with a conductive radius filler 70 connected via the conductive radius filler connection 94 to an over-arching system 100, such as in the form of a fastener system 120, in the stringer 62 of FIG. 9A. As shown in FIG. 9B, the current handling system 125, such as in the form of the edge glow handling system 125*a*, includes the conductive radius filler 70, which comprises the radius filler 80 with the conductive element 90, connected to the fastener system 120, which comprises a plurality of fasteners 118 fastening the horizontal flanges 264*a*, 264*b* of the composite structure 28, such as the stringer 62, to the skin panel 68 and held in place via fastener connections 222. The edge glow handling system 125*a* (see FIG. 9B) preferably comprises the conductive radius filler 70 (see FIG. 9B) connected to the fastener system 120 (see FIG. 9B) via a conductive radius filler connection 94 (see FIG. 9B) cured into the laminate 268 (see FIG. 3A). For low level current 228*b* (see FIG. 3F), the conductive radius filler connection 94 (see FIGS. 3A, 3F, 9B) may comprise thin foil contacts 114 (see FIG. 3A) that contact both the conductive radius filler 70 (see FIG. 9B) and intersect one or more fasteners 118 (see FIG. 9B) of the fastener system 120 (see FIG. 9B).

As shown in FIG. 9B, the stringer 62 includes the vertical webs 260*a*, 260*b*, horizontal flanges 264*a*, 264*b* joined to the skin panel 68, and shows the fastener system 120 with the plurality of fasteners 118 fastening the horizontal flanges 264*a*, 264*b* to the skin panel 68 and being held in place via fastener connections 222. The horizontal flanges 264*a*, 264*b* each have the cut surface 224, such as the cut edge 224*a*.

As further shown in FIG. 9B, with use of the current handling system 125, such as in the form of the edge glow handling system 125*a*, when the current source 218, such as the lightning strike 218*a*, strikes a fastener 118, the current 228 (see FIG. 3F) from the lightning strike 218*a* becomes redirected current 228*a* (see FIG. 3F) that is redirected via one or more redirected current pathways 76*b* through the conductive radius filler 70.

Thus, the resulting current handling system 125 (see FIGS. 3F, 9B), such as in the form of the edge glow handling system 125*a* (see FIGS. 3F, 9B), may result in edge glow mitigation 215 (see FIG. 3F) of edge glow 216 (see FIGS. 3F, 9B), and preferably minimizes or eliminates plasma ejection 216*a* (see FIGS. 3F, 9A). The conductive radius filler 70 (see FIG. 9B) preferably functions or acts as an electrically dissipative pathway 230 (see FIG. 9B) or through path, rather than a ground or stopping point.

Figure 10A:
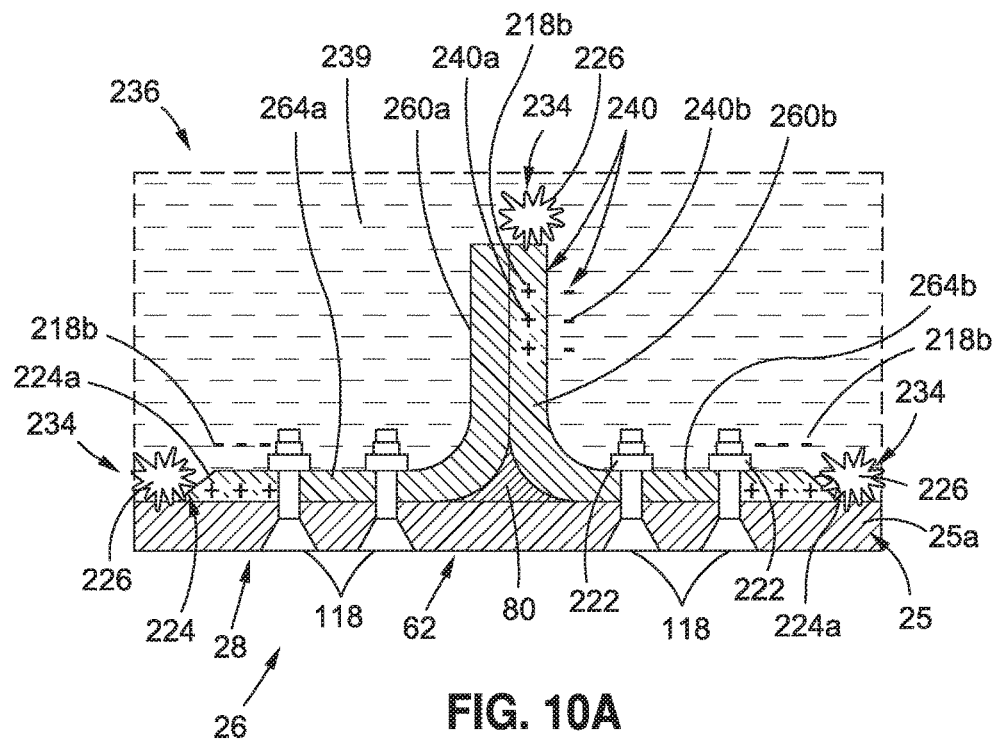
FIG. 10A is an illustration of a known radius filler in a stringer in a fuel tank, and shows refueling electrification and electrostatic discharge.

Now referring to FIG. 10A, FIG. 10A is an illustration of a known radius filler 80 in a composite structure 28, such as in the form of stringer 62, of a composite assembly 26, where the stringer 62 is in a fuel tank 25 with one or more fuel tank surfaces 25*a*. FIG. 10A shows refueling electrification 236 and electrostatic discharge 234, such as in the form of electric sparks 226.

As shown in FIG. 10A, the stringer 62 includes vertical webs 260*a*, 260*b*, horizontal flanges 264*a*, 264*b* joined to a fuel tank surface 25*a* of the fuel tank 25, and a plurality of fasteners 118 fastening the horizontal flanges 264*a*, 264*b* to the fuel tank surface 25*a* and being held in place via fastener connections 222. As shown in FIG. 10A, refueling electrification 236 from adding fuel 239 to the fuel tank 25 can cause electrostatic discharge 234, such as in the form of electric sparks 226, at the ends of the vertical webs 260*a*, 260*b* and at the cut surfaces 224, such as the cut edges 224*a*, of the horizontal flanges 264*a*, 264*b*. Electrostatic discharge 234 (see FIGS. 3F, 10A) means the release of static electricity or electric sparks 226 (see FIGS. 3F, 10A), such as from a lightning strike 218*a* (see FIG. 3F), such as from a static charge buildup 218*b* (see FIGS. 3F, 10A) of electric charge 240 (see FIGS. 3F, 10A) due to friction on the exterior of the composite structure 28, such as the wing 18 (see FIG. 1), or from another electrostatic discharge event. The electric charge 240 (see FIG. 10A) comprises positive charges 240*a* (see FIG. 10A) and negative charges 240*b* (see FIG. 10A).

Figure 10B:
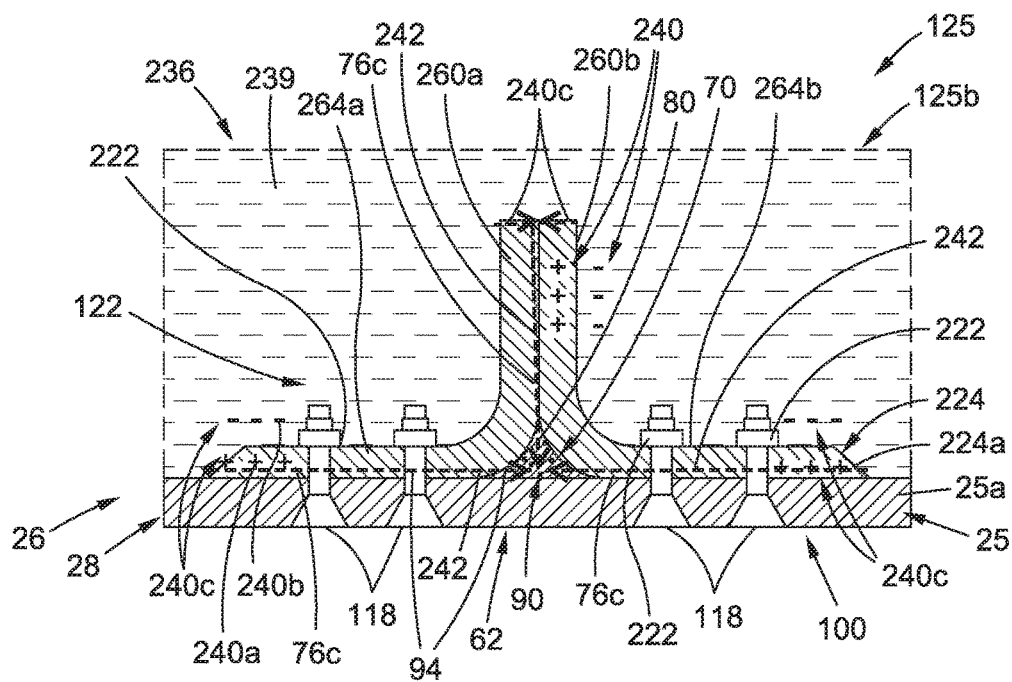
FIG. 10B is an illustration of an embodiment of a static dissipation handling system with a conductive radius filler connected to a fuel tank system in the stringer of FIG. 10A, and shows redirected charge pathways and redirected current pathways through the conductive radius filler.

Now referring to FIG. 10B, FIG. 10B is an illustration of another current handling system 125, such as in the form of a static dissipation handling system 125*b*, with a conductive radius filler 70 connected via the conductive radius filler connection 94 to an over-arching system 100, such as in the form of a fuel tank system 122, in the stringer 62 of FIG. 10A, and shows redirected charge pathways 242 and redirected current pathways 76*c* through the conductive radius filler 70 to handle static dissipation 232 (see FIG. 3F) and electrostatic discharge 234 (see FIGS. 3F, 10A) from refueling electrification 236.

As shown in FIG. 10B, the current handling system 125, such as in the form of the static dissipation handling system 125*b*, includes the conductive radius filler 70, which comprises the radius filler 80 with the conductive element 90, connected to the fuel tank system 122, which comprises the plurality of fasteners 118 fastening the horizontal flanges 264*a*, 264*b* of the composite structure 28, such as the stringer 62, to the fuel tank 25 having one or more fuel tank surfaces 25*a*, and being held in place via fastener connections 222. As shown in FIG. 10B, the stringer 62 includes the vertical webs 260*a*, 260*b*, and the horizontal flanges 264*a*, 264*b* having the cut surfaces 224, such as the cut edges 224*a*, where the horizontal flanges 264*a*, 264*b* are joined to the fuel tank surface 25*a* of the fuel tank 25 with the plurality of fasteners 118.

The static dissipation handling system 125*b* (see FIG. 10B) preferably comprises the conductive radius filler 70 (see FIG. 10B) connected to the fuel tank system 122 (see FIG. 10B) via the conductive radius filler connection 94 (see FIG. 10B) which may be cured into the laminate 268 (see FIG. 3A). For low level current 228*b* (see FIG. 3F), the conductive radius filler connection 94 (see also FIG. 10B) may comprise thin foil contacts 114 (see FIG. 3A) that contact both the conductive radius filler 70 (see FIG. 10B) and intersect one or more of the fasteners 118 (see FIG. 10B) in the fuel tank system 122 (see FIGS. 3F, 10B). This allows current 228 (see FIG. 3F) to flow from the fuel tank 25 (see FIG. 10B) into the one or more fasteners 118 (see FIG. 10B).

With use of the current handling system 125 (see FIG. 10B), such as in the form of the static dissipation handling system 125*b* (see FIG. 10B), when there is refueling electrification 236, to avoid static charge buildup 218*b* (see FIGS. 3F, 10A) of electric charge 240 (see FIGS. 3F, 10A, 10B) with, for example, addition of fuel 239 (see FIG. 10B) into the fuel tank 25 (see FIG. 10B), the electric charge 240 (see FIG. 10B) comprising positive charge 240*a* (see FIG. 10B) and negative charge 240*b* (see FIG. 10B) is redirected as redirected charge 240*c* (see FIGS. 3F, 10B). As shown in FIG. 10B, the redirected charge 240*c* is preferably redirected from the cut edges 224*a* of the horizontal flanges 264*a*, 264*b* and from the ends of the vertical webs 260*a*, 260*b* via redirected charge pathways 242 and redirected current pathways 76c through the conductive radius filler 70.

Thus, the resulting current handling system 125 (see FIGS. 3F, 10B), such as in the form of static dissipation handling system 125b (see FIGS. 3F, 10B), may result in static dissipation 232 (see FIG. 3F) and electrostatic discharge mitigation 235 (see FIG. 3F) of electrostatic discharge 234 (see FIGS. 3F, 10A), and preferably minimizes or eliminates potential electric spark(s) 226a (see FIG. 3F) that may result from refueling electrification 236 (see FIGS. 3F, 10B).

Figure 11A:
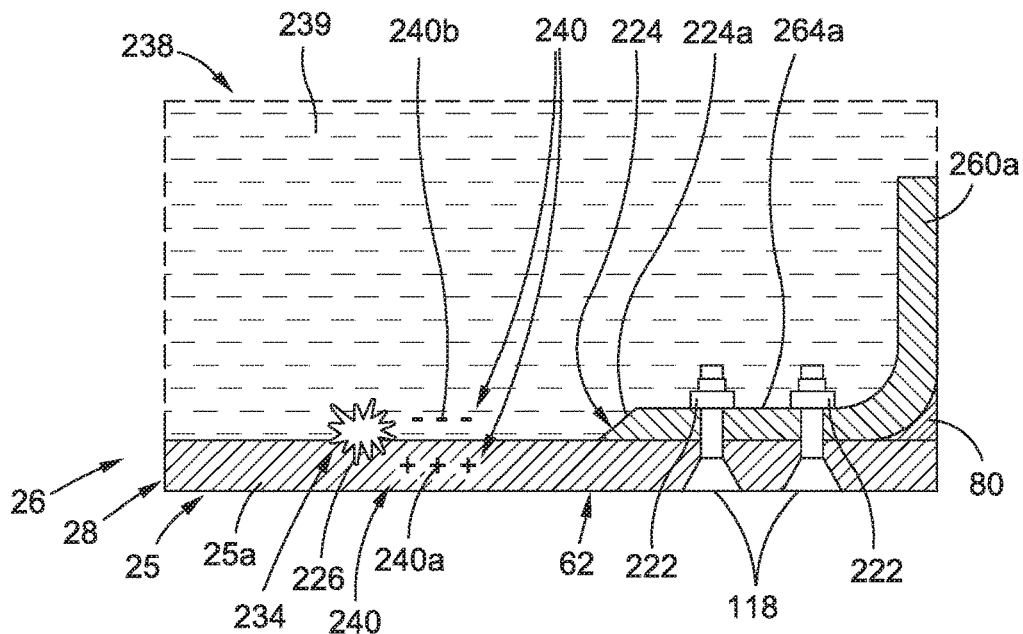
FIG. 11A is an illustration of a partial view of a known radius filler in a stringer in a fuel tank, and shows fuel slosh and an electric spark.

Now referring to FIG. 11A, FIG. 11A is an illustration of a partial view of a known radius filler 80 in a composite structure 28, such as in the form of stringer 62, of a composite assembly 26, where the stringer 62 is in a fuel tank 25 with one or more fuel tank surfaces 25a. FIG. 11A shows fuel slosh 238 and electrostatic discharge 234, such as in the form of electric sparks 226.

FIG. 11A shows a vertical web 260a, and a horizontal flange 264a with a cut surface 224, such as a cut edge 224a, where the horizontal flange 264a is joined to the fuel tank surface 25a of the fuel tank 25 with a plurality of fasteners 118 and held in place via fastener connections 222. Fuel slosh 238 (see FIG. 11A), which means sloshing or movement of fuel 239 (see FIG. 11A) in the fuel tank 25 (see FIG. 11A), can cause electrostatic discharge 234 (see FIG. 11A), such as in the form of electric sparks 226 (see FIG. 11A), near or down from the cut surface 224 (see FIG. 11A), such as the cut edge 224a (see FIG. 11A), of the horizontal flange 264a (see FIG. 11A). As shown in FIG. 11A, the electric charge 240 comprises positive charges 240a and negative charges 240b.

Figure 11B:
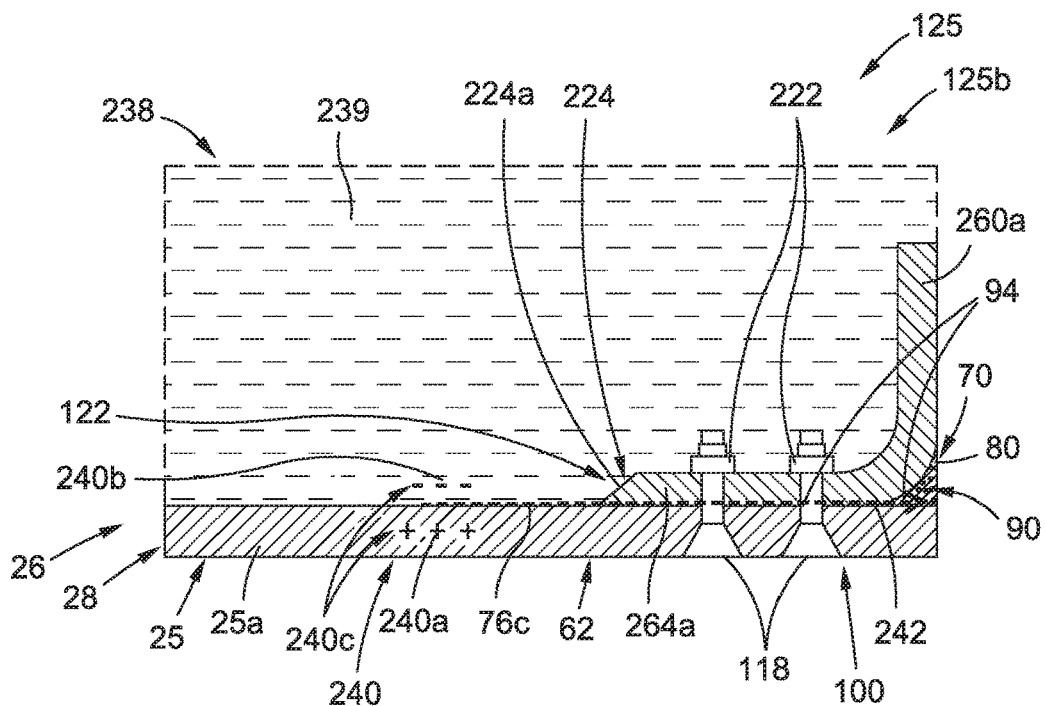
FIG. 11B is an illustration of another embodiment of a static dissipation handling system with a conductive radius filler connected to a fuel tank system in the stringer of FIG. 11A, and shows redirected charge pathways and redirected current pathways through the conductive radius filler.

Now referring to FIG. 11B, FIG. 11B is an illustration of the current handling system 125, such as in the form of the static dissipation handling system 125b, with a conductive radius filler 70 connected via the conductive radius filler connection 94 to an over-arching system 100, such as in the form of a fuel tank system 122, in the stringer 62 of FIG. 11A, and shows redirected charge pathways 242 and redirected current pathways 76c through the conductive radius filler 70.

The static dissipation handling system 125b (see FIG. 11B) may be used to handle static dissipation 232 (see FIG. 3F) and electrostatic discharge 234 (see FIGS. 3F, 11A) caused by fuel slosh 238 (see FIGS. 3F, 11B). FIG. 11B shows the static dissipation handling system 125b with the conductive radius filler 70 in the composite structure 28, such as in the form of stringer 62, of the composite assembly 26, where the stringer 62 is in the fuel tank 25 with one or more fuel tank surfaces 25a. FIG. 11B shows redirected charge 240c and a redirected charge pathway 242 through the conductive radius filler 70 to handle static dissipation 232 (see FIG. 3F) and electrostatic discharge 234 (see FIGS. 3F, 11A) caused by fuel slosh 238 (see FIGS. 3F, 11B).

As shown in FIG. 11B, the current handling system 125, such as in the form of the static dissipation handling system 125b, includes the conductive radius filler 70, which comprises the radius filler 80 with the conductive element 90, connected to the fuel tank system 122, which comprises the plurality of fasteners 118 fastening the horizontal flange 264a to the fuel tank surface 25a. FIG. 11B shows the stringer 62, in partial view, with the vertical web 260a and the horizontal flange 264a with the cut surface 224, such as the cut edge 224a, where the horizontal flange 264a is joined to the fuel tank surface 25a of the fuel tank 25 with the plurality of fasteners 118 and held in place via fastener connections 222.

The static dissipation handling system 125b (see FIG. 11B) preferably comprises the conductive radius filler 70 (see FIG. 11B) connected to the fuel tank system 122 (see FIG. 11B) via the conductive radius filler connection 94 (see also FIGS. 3A, 3F) which may be cured into the laminate 268 (see FIG. 3A). For low level current 228b (see FIG. 3F), the conductive radius filler connection 94 (see FIGS. 3A, 3F, 11B) may comprise thin foil contacts 114 (see FIG. 3A) that contact both the conductive radius filler 70 (see FIG. 11B) and intersect one or more fasteners 118 (see FIG. 11B) in the fuel tank system 122 (see FIGS. 3F, 11B). This allows current 228 (see FIG. 3F) to flow from the fuel tank 25 (see FIG. 11B) into the one or more fasteners 118 (see FIG. 11B).

With use of the current handling system 125 (see FIG. 11B), such as in the form of the static dissipation handling system 125b (see FIG. 11B), when there is fuel slosh 238 of fuel 239 in the fuel tank 25, to avoid static charge buildup 218b (see FIGS. 3F, 11A) of electric charge 240 (see FIGS. 3F, 11B) with, for example, addition of the fuel 239 (see FIG. 11B) into the fuel tank 25 (see FIG. 11B), the electric charge 240 (see FIG. 11B) comprising positive charge 240a (see FIG. 11B) and negative charge 240b (see FIG. 11B) becomes redirected charge 240c (see FIGS. 3F, 11B). As shown in FIG. 11B, the redirected charge 240c is preferably redirected from the fuel 239 at the fuel tank surface 25a through the cut edges 224a of the horizontal flanges 264a via redirected charge pathway 242 and redirected current pathway 76c to and through the conductive radius filler 70.

Thus, the resulting current handling system 125 (see FIGS. 3F, 11B), such as in the form of the static dissipation handling system 125b (see FIGS. 3F, 11B), may result in static dissipation 232 (see FIG. 3F) and electrostatic discharge mitigation 235 (see FIG. 3F), and preferably minimizes or eliminates potential electric spark(s) 226a (see FIG. 3F) that may result from fuel slosh 238 (see FIGS. 3F, 11A, 11B).

Figure 12A:
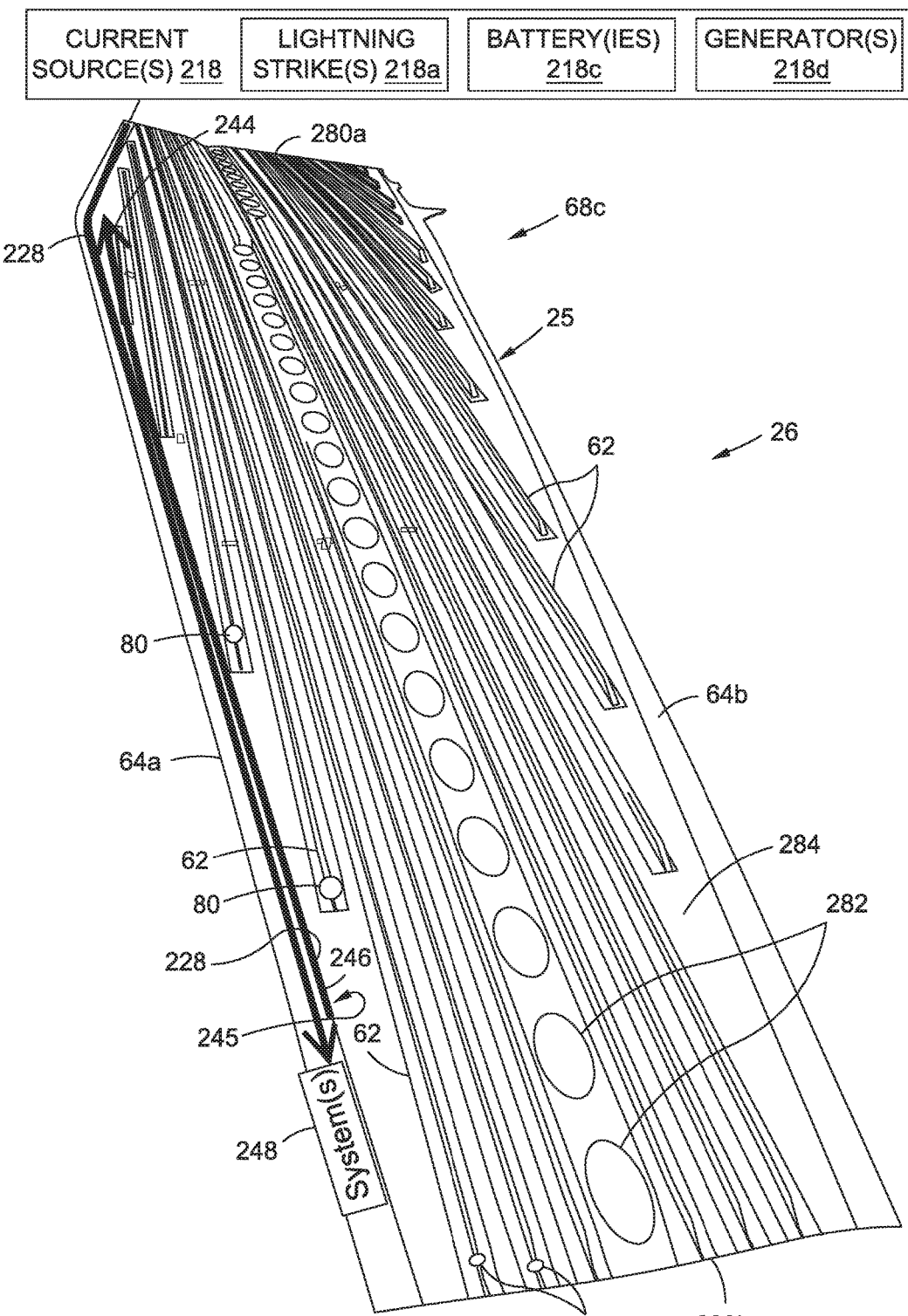
FIG. 12A is an illustration of known radius fillers in an aircraft wing panel, and shows current return via a dedicated conductive system.

Now referring to FIG. 12A, FIG. 12A is an illustration of known radius fillers 80 in a composite assembly 26, in the form of an aircraft wing panel 68c, and shows current return 244 via a known dedicated conductive system 245, such as current return wires 246. FIG. 12A shows the composite assembly 26, in the form of the aircraft wing panel 68c, having an inboard end 280a and an outboard end 280b, and access doors 282, for fueling or maintenance, positioned down the center of the aircraft wing panel 68c. As shown in FIG. 12A, the aircraft wing panel 68c comprises an inner wall 284 of the fuel tank 25, and has attached stringers 62 with radius fillers 80. The aircraft wing panel 68c (see FIG. 12A) is attached to a front spar 64a (see FIG. 12A) and attached to a rear spar 64b (see FIG. 12A). The composite assembly 26 (see FIG. 12A), in the form of the aircraft wing panel 68c (see FIG. 12A), has a dedicated conductive system 245 (see FIG. 12A) comprising current return wires 246 (see FIG. 12A) connected to one or more electronic systems 248 (see FIG. 12A) for the aircraft 12a (see FIG. 1).

As shown in FIG. 12A, current 228 from a current source 218 flows or travels from the current source 218 to the one or more electronic systems 248. The current source 218 may comprise a current source that is internal to the aircraft 12a (see FIG. 1), such as one or more battery(ies) 218c, one or more generator(s) 218d, or another suitable internal current, or the current source 218 may comprise an external current 218e (see FIG. 3F), for example, one or more lightning strike(s) 218a, or another suitable external current 218e (see FIG. 3F). The one or more electronic systems 248 (see FIG. 12A) may comprise electronic systems of the aircraft 12a (see FIG. 1) that control various lights, sensors, flaps, or other devices of the aircraft 12a (see FIG. 1), such as the wings 18 (see FIG. 1). The current 228 (see FIG. 12A) then flows from the one or more electronic systems 248 (see FIG. 12A) back to the current source 218 (see FIG. 12A), as current return 244 (see FIG. 12A), via the current return wires 246 (see FIG. 12A) of the dedicated conductive system 245 (see FIG. 12A). The current return wires 246 (see FIG. 12A) of the dedicated conductive system 245 (see FIG. 12A) typically comprise heavy and complex wiring.

Figure 12B:
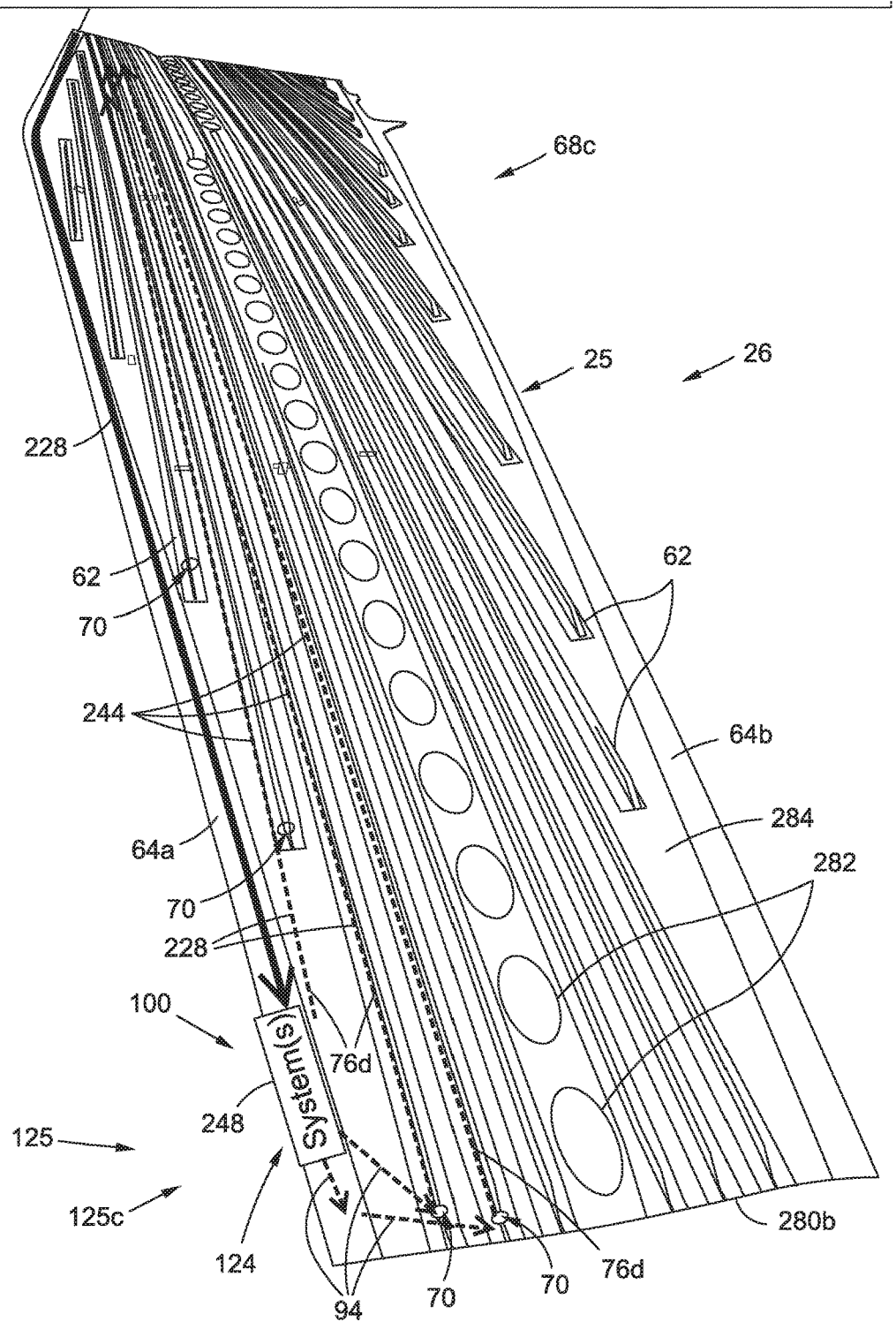
FIG. 12B is an illustration of an embodiment of a current return handling system with conductive radius fillers connected to a current generating in the aircraft wing panel of FIG. 12A, and shows redirected current pathways through the conductive radius fillers.

Now referring to FIG. 12B, FIG. 12B is an illustration of another embodiment of a current handling system 125, such as in the form of a current return handling system 125c, with conductive radius fillers 70 connected via conductive radius filler connections 94 to an over-arching system 100, such as in the form of a current generating system 124, including the electronic systems 248, as shown in FIG. 12A.

FIG. 12B shows the composite assembly 26, in the form of the aircraft wing panel 68c, having the inboard end 280a and the outboard end 280b, and the access doors 282, for fueling or maintenance, positioned down the center of the aircraft wing panel 68c. As shown in FIG. 12B, the aircraft wing panel 68c comprises the inner wall 284 of the fuel tank 25, and has attached stringers 62 with the conductive radius fillers 70 as disclosed herein. The aircraft wing panel 68c (see FIG. 12B) is attached to the front spar 64a (see FIG. 12B) and attached to the rear spar 64b (see FIG. 12B). FIG. 12B shows the redirected current pathways 76d of the current 228 through the conductive radius fillers 70.

As shown in FIG. 12B, current 228 from the current source 218 flows or travels from the current source 218 to the one or more electronic systems 248. The current source 218 (see FIG. 12B) may be internal to the aircraft 12a (see FIG. 1), such as one or more battery(ies) 218c (see FIG. 12B), one or more generator(s) 218d (see FIG. 12B), or another suitable internal current, or the current source 218 (see FIG. 12B) may be an external current 218e (see FIG. 3F), such as one or more lightning strike(s) 218a (see FIG. 12B), or another suitable external current 218e (see FIG. 3F). The one or more electronic systems 248 (see FIG. 12B) may comprise electronic systems of the aircraft 12a (see FIG. 1) that control various lights, sensors, flaps, or other devices of the aircraft 12a (see FIG. 1), such as the wings 18 (see FIG. 1). The current 228 (see FIG. 12B) then flows from the one or more electronic systems 248 (see FIG. 12B) back to the current source 218 (see FIG. 12B), as current return 244 (see FIG. 12B), via redirected current pathways 76d (see FIG. 12B) through the conductive radius filler connections 94 (see FIG. 12B) connected to the conductive radius fillers 70 (see FIG. 12B) in the stringers 62 (see FIG. 12B), through the conductive radius fillers 70 (see FIG. 12B), and through the stringers 62 (see FIG. 12B) to the current source 218 (see FIG. 12B).

The conductive radius filler connections 94 (see FIG. 12B) connecting the conductive radius fillers 70 (see FIG. 12B) to the current generating system 124 (see FIG. 12B) may comprise post-cure conductive connections 96 (see FIG. 3A), such as wire connections 102 (see FIG. 3A), pathway connections 104 (see FIG. 3A), or another suitable post-cure-conductive connection 96 (see FIG. 3A). Alternatively, the conductive radius filler connections 94 (see FIG. 12B) connecting the conductive radius fillers 70 (see FIG. 12B) to the current generating system 124 (see FIG. 12B) may comprise co-cured conductive connections 98 (see FIG. 3A), such as one or more clip(s) 110 (see FIG. 3A), one or more metallic contact point(s) 112 (see FIG. 3A), such as one or more thin foil contact(s) 114 (see FIG. 3A) and one or more metal-resin film contact(s) 116 (see FIG. 3A), or another suitable co-cured conductive connection 98 (see FIG. 3A).

The use of the current return handling system 125c (see FIG. 12B) with the conductive radius fillers 70 (see FIG. 12B) connected to the current generating system 124 (see FIG. 12B) results in a minimized dedicated conductive system 245a (see FIG. 3F) that may minimize or eliminate the current return wires 246 (see FIG. 12A) of the dedicated conductive system 245 (see FIG. 12A).

In another embodiment of the disclosure, there is provided a conductive radius filler system 10 (see FIGS. 1, 3A) for an aircraft 12a (see FIG. 1). The conductive radius filler system 10 (see FIGS. 1, 3A) comprises an aircraft composite assembly 26 (see FIGS. 1, 3A) comprising one or more composite structures 28 (see FIGS. 1, 3A), such as aircraft composite structures 28a (see FIGS. 1, 3A). The one or more composite structures 28 (see FIGS. 1, 3A), such as aircraft composite structures 28a (see FIGS. 1, 3A), comprise at least one composite wing 18a (see FIG. 3A) with a plurality of stringers 62 (see FIG. 3A) and a plurality of spars 64 (see FIG. 3A) forming one or more radius filler regions 72 (see FIG. 3A).

The conductive radius filler system 10 (see FIGS. 1, 3A) further comprises one or more conductive radius fillers 70 (see FIG. 3A) filling the one or more radius filler regions 72 (see FIG. 3A). Each of the conductive radius fillers 70 (see FIG. 3A) has a conductive element 90 (see FIG. 3A) comprising electrically conductive material 92 (see FIG. 3A).

The one or more conductive radius fillers 70 (see FIG. 3A) each comprise a radius filler 80 (see FIG. 3A) with the conductive element 90 (see FIG. 3A), where the radius filler 80 (see FIG. 3A) comprises one of a unidirectional radius filler 82 (see FIGS. 3A, 3B), a laminated radius filler 84 (see FIGS. 3A, 3C), a homogeneous radius filler 86 (see FIGS. 3A, 3D), a metallic radius filler 88 (see FIGS. 3A, 3D), or another suitable radius filler 80 (see FIG. 3A).

The conductive radius filler system 10 (see FIG. 3A) further comprises one or more over-arching systems 100 (see FIGS. 3A, 3F) in the aircraft 12a (see FIGS. 1, 3A). The one or more over-arching systems 100 (see FIGS. 3A, 3F) comprise one or more of a fastener system 120 (see FIGS. 3A, 3F), a fuel tank system 122 (see FIGS. 3A, 3F), and a current generating system 124 (see FIGS. 3A, 3F). The one or more over-arching systems 100 (see FIGS. 3A, 3F) are connected to the one or more conductive radius fillers 70 (see FIGS. 3A, 3F), via one or more conductive radius filler connections 94 (see FIGS. 3A, 3F), forming one or more current handling systems 125 (see FIG. 3F) of the conductive radius filler system 10 (see FIGS. 3A, 3F) for the aircraft 12a (see FIGS. 3A, 3F). The one or more current handling systems 125 (see FIG. 3F) comprise one or more of an edge glow handling system 125a (see FIG. 3F) configured to handle edge glow 216 (see FIG. 3F), a static dissipation handling system 125b (see FIG. 3F) configured to handle static dissipation 232 (see FIG. 3F), and a current return handling system 125c (see FIG. 3F) configured to handle current return 244 (see FIG. 3F).

The edge glow handling system 125a (see FIGS. 3F, 9B) comprises one or more redirected current pathways 76b (see FIGS. 3F, 9B) from one or more fasteners 118 (see FIGS. 3F, 9B) of the fastener system 120 (see FIGS. 3F, 9B), through the one or more conductive radius fillers 70 (see FIGS. 3F, 9B), to handle edge glow 216 (see FIGS. 3F, 9B), as a secondary effect 220b (see FIG. 3F) of one or more lightning strikes 218a (see FIGS. 3F, 9B), and to provide edge glow mitigation 215 (see FIG. 3F).

The static dissipation handling system 125b (see FIGS. 3F, 10B, 11B) comprises one or more redirected charge pathways 242 (see FIGS. 3F, 10B, 11B) and one or more redirected current pathways 76c (see FIGS. 3F, 10B, 11B) from one or more fuel tank surfaces 25a (see FIGS. 3F, 10B, 11B) of the fuel tank 25 (see FIGS. 3F, 10B, 11B), of the fuel tank system 122 (see FIGS. 3F, 10B, 11B), through the one or more conductive radius fillers 70 (see FIGS. 3F, 10B, 11B), to handle static dissipation 232 (see FIG. 3F) and to provide electrostatic discharge mitigation 234 (see FIG. 3F) of electrostatic discharge 235 (see FIG. 3F) caused by refueling electrification 236 (see FIG. 3F) and fuel slosh 238 (see FIG. 3F).

The current return handling system 125c (see FIGS. 3F, 12B) comprises one or more redirected current pathways 76d (see FIGS. 3F, 12B) from one or more electronic systems 248 (see FIGS. 3F, 12B) of the current generating system 124 (see FIG. 3F), through the one or more conductive radius fillers 70 (see FIGS. 3F, 12B), to handle current return 244 (see FIGS. 3F, 12B) and to provide a minimized dedicated conductive system 245a (see FIG. 3F).

Figure 13:
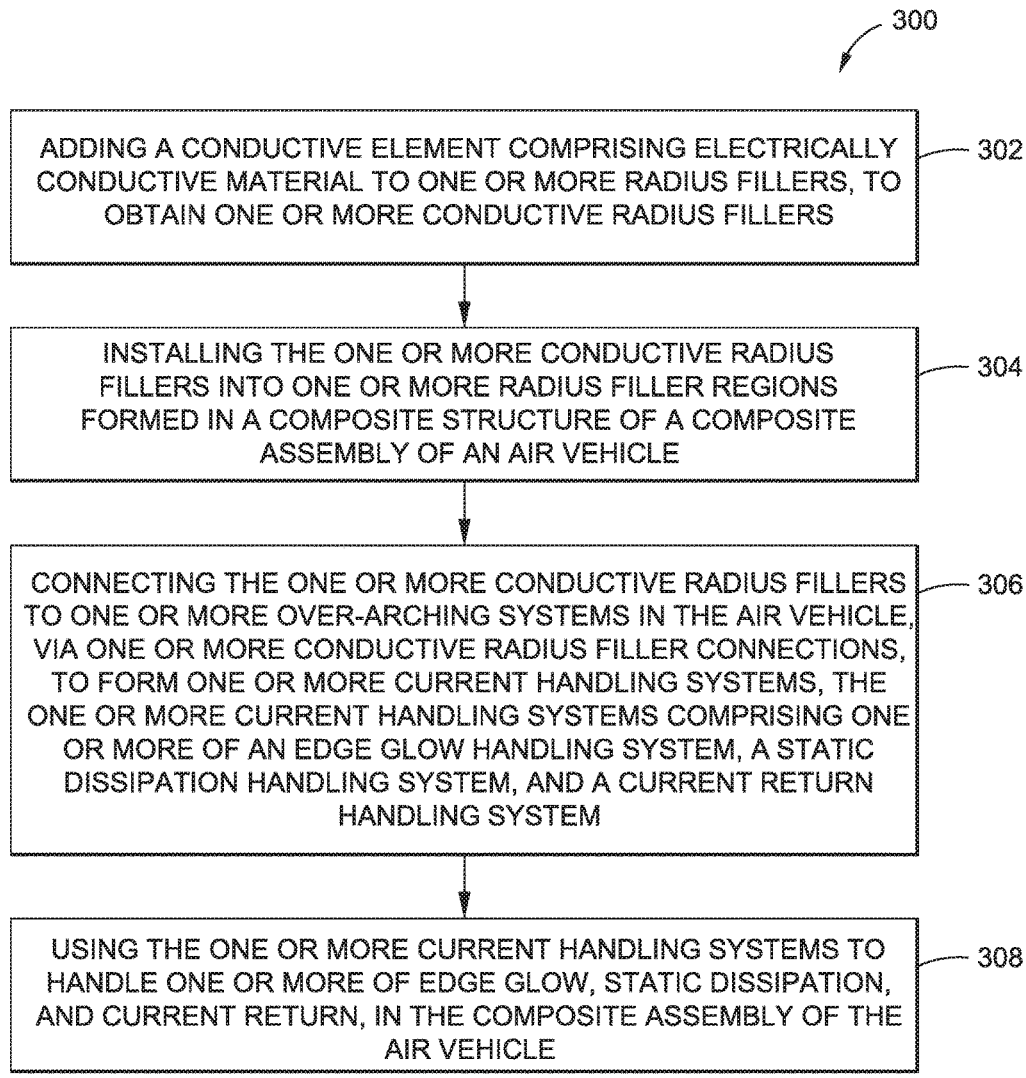
FIG. 13 is an illustration of a block flow diagram showing an exemplary embodiment of a method of the disclosure.

Now referring to FIG. 13, FIG. 13 is an illustration of a block flow diagram showing an exemplary embodiment of a method 300 of the disclosure. As shown in FIG. 13, there is provided the method 300 of making and using a conductive radius filler system 10 (see FIG. 3A) for a composite assembly 26 (see FIGS. 1, 3A) of an air vehicle 12 (see FIGS. 1, 3A).

As shown in FIG. 13, the method 300 comprises step 302 of adding a conductive element 90 (see FIGS. 3A, 3E) comprising electrically conductive material 92 (see FIGS. 3A, 3E), to one or more radius fillers 80 (see FIG. 3A), to obtain one or more conductive radius fillers 70 (see FIG. 3A). The step 302 (see FIG. 13) of adding the conductive element 90 (see FIGS. 3A, 3E) further comprises adding the conductive element 90 (see FIGS. 3A, 3E) comprising the electrically conductive material 92 (see FIGS. 3A, 3E) to one or more radius fillers 80 (see FIG. 3A) comprising one or more of a unidirectional radius filler 82 (see FIGS. 3A, 3B), a laminated radius filler 84 (see FIGS. 3A, 3C), a homogeneous radius filler 86 (see FIGS. 3A, 3D), a metallic radius filler 88 (see FIGS. 3A, 3D), or another suitable radius filler 80 (see FIG. 3A).

As shown in FIG. 13, the method 300 further comprises step 304 of installing the one or more conductive radius fillers 70 (see FIG. 3A) into one or more radius filler regions 72 (see FIG. 3A) formed in a composite structure 28 (see FIG. 3A) of the composite assembly 26 (see FIG. 3A).

As shown in FIG. 13, the method 300 further comprises step 306 of connecting the one or more conductive radius fillers 70 (see FIG. 3A) to one or more over-arching systems 100 (see FIG. 3A) in the air vehicle 12 (see FIGS. 1, 3A), via one or more conductive radius filler connections 94 (see FIG. 3A), to form one or more current handling systems 125 (see FIG. 3F). The one or more current handling systems 125 (see FIG. 3F) comprise one or more of an edge glow handling system 125a (see FIGS. 3F, 9B), a static dissipation handling system 125b (see FIGS. 3F, 10B, 11B), and a current return handling system 125c (see FIG. 3F, 12B).

The step 306 (see FIG. 13) of connecting the one or more conductive radius fillers 70 (see FIG. 3A) to the one or more over-arching systems 100 (see FIG. 3A) in the air vehicle 12 (see FIG. 3A), further comprises connecting the one or more conductive radius fillers 70 (see FIG. 3A) to the one or more over-arching systems 100 (see FIG. 3A) comprising one or more of a fastener system 120 (see FIGS. 3A, 9B), a fuel tank system 122 (see FIGS. 3A, 10B, 11B), and a current generating system 124 (see FIG. 3A, 12B).

As shown in FIG. 13, the method 300 further comprises step 308 of using the one or more current handling systems 125 (see FIG. 3F) to handle one or more of edge glow 216 (see FIG. 3F), static dissipation 232 (see FIG. 3F), and current return 244 (see FIG. 3F), in the composite assembly 26 (see FIG. 3F) of the air vehicle 12 (see FIG. 3F).

The step 308 (see FIG. 13) of using the one or more current handling systems 125 (see FIG. 3F) further comprises using the edge glow handling system 125a (see FIGS. 3F, 9B) comprising one or more redirected current pathways 76b (see FIGS. 3F, 9B) from one or more fasteners 118 (see FIGS. 3F, 9B) of the fastener system 120 (see FIGS. 3F, 9B) via one or more conductive radius filler connections 94 (see FIGS. 3A, 9B) to and through the one or more conductive radius fillers 70 (see FIGS. 3F, 9B), to handle edge glow 216 (see FIGS. 3F, 9A) as a secondary effect 220b (see FIG. 3F) of one or more lightning strikes 218a (see FIGS. 3F, 9B), and to provide edge glow mitigation 215 (see FIG. 3F).

The step 308 (see FIG. 13) of using the one or more current handling systems 125 (see FIGS. 3F, 10B, 11B) further comprises using the static dissipation handling system 125b (see FIGS. 3F, 10B, 11B) comprising one or more redirected charge pathways 242 (see FIGS. 3F, 10B, 11B), and one or more redirected current pathways 76c (see FIGS. 3F, 10B, 11B), from one or more fuel tank surfaces 25a (see FIGS. 3F, 10B, 11B) of the fuel tank system 122 (see FIGS. 3F, 10B, 11B), via one or more conductive radius filler connections 94 (see FIGS. 3A, 10B, 11B) to and through the one or more conductive radius fillers 70 (see FIGS. 3F, 10B, 11B), to handle static dissipation 232 (see FIG. 3F) and to provide electrostatic discharge mitigation 234 (see FIG. 3F) of electrostatic discharge 235 (see FIGS. 3F, 10A, 11A) caused by refueling electrification 236 (see FIGS. 3F, 10A) and fuel slosh 238 (see FIGS. 3F, 11A).

The step 308 (see FIG. 13) of using the one or more current handling systems 125 (see FIGS. 3F, 12B) further comprises using the current return handling system 125c (see FIGS. 3F, 12B) comprising one or more redirected current pathways 76d (see FIGS. 3F, 12B) from one or more electronic systems 248 (see FIGS. 3F, 12B) of the current generating system 124 (see FIG. 3F) via conductive radius filler connections 94 (see FIG. 3A, 12B) to and through the one or more conductive radius fillers 70 (see FIGS. 3F, 12B), to handle current return 244 (see FIGS. 3F, 12B) and to provide a minimized dedicated conductive system 245a (see FIG. 3F).

Disclosed embodiments of the conductive radius filler system 10 (see FIGS. 3A-3F) and the method 300 (see FIG. 13) of making and using the conductive radius filler system 10 (see FIGS. 3A-3F) preferably for a composite assembly 26 (see FIGS. 1, 3A) of an air vehicle 12 (see FIGS. 1, 3A) provide for adding a conductive element 90 (see FIG. 3A) to a typically non-conductive radius filler 80 (see FIG. 3A) to form a conductive radius filler 70 (see FIG. 3A), connecting the conductive radius filler 70 (see FIG. 3A) to an over-arching system 100 (see FIG. 3A), to obtain one or more current handling systems 125 (see FIG. 3A) to handle edge glow 216 (see FIG. 3F), static dissipation 232 (see FIG. 3F), and/or current return 244 (see FIG. 3F). How conductivity is imparted to non-conductive radius fillers 80 (see FIG. 3A) depends on the type of radius filler 80 (see FIG. 3A) and the conductivity level 78 (see FIG. 3A) required.

In particular, disclosed embodiments of the conductive radius filler system 10 (see FIGS. 3A-3F) and the method 300 (see FIG. 13) provide for an edge glow handling system 125a (see FIG. 3F), where the conductive radius filler 70 (see FIGS. 3A, 9B) is connected via the conductive radius filler connection 94 (see FIGS. 3A, 9B) to the over-arching system 100 (see FIGS. 3A, 9B), such as in the form of the fastener system 120 (see FIGS. 3A 9B), to result in edge glow mitigation 215 (see FIG. 3F) of edge glow 216 (see FIGS. 3F, 9A). The conductive radius filler 70 (see FIGS. 3A, 9B) acts as an electrically dissipative pathway 230 (see FIGS. 3F, 9B). Such conductive radius filler system 10 (see FIGS. 3A-3F) with the edge glow handling system 125a (see FIG. 3F) may minimize or eliminate the use of sealants to cover the trimmed or cut edges of the internal composite stringers, spars, and ribs, and to cover metallic features, such as metal fasteners, on the aircraft composite wings. This may reduce the overall weight of the aircraft 12a (see FIG. 1), which may result in decreased fuel consumption, and, in turn, may result in decreased fuel costs. Moreover, by reducing or eliminating the use of sealants and fastener seal caps, the manufacturing time and labor may be reduced, which may, in turn, result in decreased manufacturing costs.

Further, disclosed embodiments of the conductive radius filler system 10 (see FIGS. 3A-3F) and the method 300 (see FIG. 13) provide for a static dissipation handling system 125b (see FIGS. 3F, 10B, 11B), where the conductive radius filler 70 (see FIGS. 3A, 10B, 11B) is connected via the conductive radius filler connection 94 (see FIGS. 3A, 10B, 11B) to the over-arching system 100 (see FIGS. 3A, 10B, 11B), such as in the form of the fuel tank system 122 (see FIGS. 3A, 10B, 11B), to result in static dissipation 232 (see FIG. 3F) of electrostatic discharge 234 (see FIGS. 3F, 10A, 11A) caused by refueling electrification 236 (see FIGS. 3F, 10A, 10B) or fuel slosh 238 (see FIGS. 3F, 11A, 11B) in the fuel tank 25 (see FIGS. 3F, 11A, 11B). Such conductive radius filler system 10 (see FIGS. 3A-3F) with the static dissipation handling system 125b (see FIGS. 3F, 10B, 11B) may minimize or eliminate the use of sealants to cover the trimmed or cut edges of the internal composite stringers, spars, and ribs, and to cover metallic features, such as metal fasteners, on the aircraft composite wings. This may reduce the overall weight of the aircraft 12a (see FIG. 1), which may result in decreased fuel consumption, and, in turn, may result in decreased fuel costs. Moreover, by reducing or eliminating the use of sealants and fastener seal caps, the manufacturing time and labor may be reduced, which may, in turn, result in decreased manufacturing costs.

In addition, disclosed embodiments of the conductive radius filler system 10 (see FIGS. 3A-3F) and the method 300 (see FIG. 13) provide for a current return handling system 125c (see FIGS. 3F, 12B), where the conductive radius filler 70 (see FIGS. 3A, 12B) is connected via the conductive radius filler connection 94 (see FIGS. 3A, 12B) to the over-arching system 100 (see FIGS. 3A, 12B), such as in the form of the current generating system 124 (see FIGS. 3A, 12B), to result in a minimized dedicated conductive system 245a (see FIG. 3F). Such conductive radius filler system 10 (see FIGS. 3A-3F) with the current return handling system 125c (see FIGS. 3F, 12B) may minimize or eliminate the use of current return wires 246 (see FIGS. 3F, 12A), of the dedicated conductive system 245 (see FIGS. 3F, 12A). Such current return wires 246 (see FIGS. 3F, 12A) may be heavy in weight and be complex to install. The current return handling system 125c (see FIGS. 3F, 12B) may thus reduce the overall weight of the aircraft 12a (see FIG. 1), which may result in decreased fuel consumption, and, in turn, may result in decreased fuel costs. Moreover, by reducing or eliminating the use of current return wires 246 (see FIGS. 3F, 12A), the manufacturing time and labor may be reduced, which may, in turn, result in decreased manufacturing costs.

Thus, disclosed embodiments of the conductive radius filler system 10 (see FIGS. 3A-3F) and the method 300 (see FIG. 13) may mitigate edge glow 216 (see FIG. 3F), as a secondary effect 220b (see FIG. 3F) of a lightning strike 218a (see FIG. 3F), may dissipate electrostatic discharge 234 (see FIG. 3F) from refueling electrification 236 (see FIG. 3F) and fuel slosh 238 (see FIG. 3F), and may provide for a minimized dedicated conductive system 245a (see FIG. 3F) by eliminating or minimizing current return wires 246 (see FIG. 3F). Moreover, connecting the conductive radius filler 70 (see FIG. 3A) to the over-arching system(s) 100 (see FIG. 3F) may include post-cure conductive connections 96 (see FIG. 3A) or co-cured conductive connections 98 (see FIG. 3A): For low level current 228b (see FIG. 3F), thin foil contacts 114 (see FIG. 3A) may be cured into the laminate 268 (see FIG. 3A), where they contact both the conductive radius filler 70 (see FIG. 3A) and intersect the fastener 118 (see FIG. 3F). This allows current 228 (see FIG. 3F) to flow either from the fuel tank 25 (see FIGS. 3A, 3F) into the fastener 118 (see FIG. 3F) and into the static dissipation handling system 125b (see FIG. 3F), as for static dissipation 232 (see FIG. 3F) in the fuel tank 25 (see FIG. 3F), or from the exterior of the wing 18 (see FIGS. 1, 3A) from the surface into the fasteners 118 (see FIG. 3F) and into the edge glow handling system 125a (see FIG. 3F) to mitigate edge glow 216 (see FIGS. 3F, 9A) as a secondary effect 220b (see FIG. 3F) of a lightning strike 218a (see FIGS. 3F, 9A). Metal-resin film contacts 116 (see FIG. 3A) may be used in a similar fashion.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:
1. A conductive radius filler system comprising:
a composite assembly comprising one or more composite structures having one or more radius filler regions;
one or more conductive radius fillers filling the one or more radius filler regions, each of the conductive radius fillers having a conductive element comprising electrically conductive material, and each of the one or more conductive radius fillers being adjacent a laminate; and
one or more conductive radius filler connections connecting the one or more conductive radius fillers to one of, a fastener system, a fuel tank system, and a current generating system, to form one or more current handling systems of the conductive radius filler system, the one or more conductive radius filler connections cured into the laminate, and the one or more conductive radius filler connections comprising one of, a clip, a metallic contact point, a thin foil contact, and a wire connection, and the one or more current handling systems providing one of, edge glow mitigation of edge glow as a secondary effect of one or more lightning strikes, electrostatic discharge mitigation of electrostatic discharge caused by refueling electrification and fuel slosh, and current return handling to provide a minimized dedicated conductive system.

2. The system of claim 1 wherein the one or more conductive radius fillers each comprise a unidirectional radius filler having the conductive element, the unidirectional radius filler comprising one of a unidirectional rolled radius filler, or a unidirectional pultruded radius filler.

3. The system of claim 1 wherein the one or more conductive radius fillers each comprise a laminated radius filler having the conductive element, the laminated radius filler comprising a stacked laminated base portion and a tip portion.

4. The system of claim 1 wherein the one or more conductive radius fillers each comprise a homogeneous radius filler having the conductive element, the homogeneous radius filler comprising one of a cast homogeneous radius filler, or an extruded homogeneous radius filler.

5. The system of claim 1 wherein the one or more conductive radius fillers each comprise a metallic radius filler having the conductive element, the metallic radius filler comprising one of a cast metallic radius filler, or a milled metallic radius filler.

6. The system of claim 1 wherein the one or more conductive radius filler connections comprise one of, a post-cure conductive connection, or a co-cured conductive connection.

7. The system of claim 1 wherein the fastener system, the fuel tank system, and the current generating system are in an air vehicle.

8. The system of claim 1 wherein the one or more current handling systems comprises an edge glow handling system comprising one or more redirected current pathways from one or more fasteners of the fastener system through the one or more conductive radius fillers, to handle the edge glow as the secondary effect of the one or more lightning strikes, and to provide the edge glow mitigation.

9. The system of claim 1 wherein the one or more current handling systems comprises one or more redirected charge pathways from one or more fuel tank surfaces of the fuel tank system through the one or more conductive radius fillers, to provide the electrostatic discharge mitigation of the electrostatic discharge caused by the refueling electrification and the fuel slosh.

10. The system of claim 1 wherein the one or more current handling systems comprises a current return handling system comprising one or more redirected current pathways from one or more electronic systems of the current generating system through the one or more conductive radius fillers, to handle the current return and to provide the minimized dedicated conductive system.

11. A conductive radius filler system for an aircraft, the conductive radius filler system comprising:
  an aircraft composite assembly comprising one or more composite structures, the one or more composite structures comprising at least one composite wing with a plurality of stringers and a plurality of spars forming one or more radius filler regions;
  one or more conductive radius fillers filling the one or more radius filler regions, each of the conductive radius fillers having a conductive element comprising electrically conductive material, and each of the one or more conductive radius fillers being adjacent a laminate; and
  one or more conductive radius filler connections connecting the one or more conductive radius fillers to one of, a fastener system, a fuel tank system, and a current generating system, in the aircraft, to form one or more current handling systems of the conductive radius filler system for the aircraft, the one or more conductive radius filler connections cured into the laminate, and the one or more conductive radius filler connections comprising one of, a clip, a metallic contact point, a thin foil contact, and a wire connection, and the one or more current handling systems providing one of, edge glow mitigation of edge glow as a secondary effect of one or more lightning strikes, electrostatic discharge mitigation of electrostatic discharge caused by refueling electrification and fuel slosh, and current return handling to provide a minimized dedicated conductive system.

12. The system of claim 11 wherein the one or more conductive radius fillers each comprise a radius filler with the conductive element, the radius filler comprising one of a unidirectional radius filler, a laminated radius filler, a homogeneous radius filler, or a metallic radius filler.

13. The system of claim 11 wherein the one or more current handling systems comprises an edge glow handling system comprising one or more redirected current pathways from one or more fasteners of the fastener system, through the one or more conductive radius fillers, to handle the edge glow as the secondary effect of the one or more lightning strikes, and to provide the edge glow mitigation.

14. The system of claim 11 wherein the one or more current handling systems comprises one or more redirected charge pathways from one or more fuel tank surfaces of the fuel tank system, through the one or more conductive radius fillers, to provide the electrostatic discharge mitigation of the electrostatic discharge caused by the refueling electrification and the fuel slosh.

15. The system of claim 11 wherein the one or more current handling systems comprises a current return handling system comprising one or more redirected current pathways from one or more electronic systems of the current generating system, through the one or more conductive radius fillers, to handle the current return and to provide the minimized dedicated conductive system.

16. A method of making a conductive radius filler system for a composite assembly of an air vehicle, to handle one or more of edge glow, electrostatic discharge, and current return, in the composite assembly, the method comprising the steps of:
  adding a conductive element comprising electrically conductive material to one or more radius fillers, to obtain one or more conductive radius fillers;
  installing the one or more conductive radius fillers into one or more radius filler regions formed in a composite structure of the composite assembly of the air vehicle, each of the one or more conductive radius fillers being adjacent a laminate of the composite structure;
  connecting the one or more conductive radius fillers to one of, a fastener system, a fuel tank system, and a current generating system in the air vehicle, via one or more conductive radius filler connections, to form one or more current handling systems, the one or more conductive radius filler connections cured into the laminate, and the one or more conductive radius filler connections comprising one of, a clip, a metallic contact point, a thin foil contact, and a wire connection; and
  using the one or more current handling systems to provide one of, edge glow mitigation of edge glow as a secondary effect of one or more lightning strikes, electrostatic discharge mitigation of electrostatic discharge caused by refueling electrification and fuel slosh, and current return handling to provide a minimized dedicated conductive system, in the composite assembly of the air vehicle.

17. The method of claim 16 wherein the step of adding the conductive element further comprises adding the conductive element comprising the electrically conductive material to one or more radius fillers comprising one or more of a unidirectional radius filler, a laminated radius filler, a homogeneous radius filler, and a metallic radius filler.

18. The method of claim 16 wherein the step of connecting the one or more conductive radius fillers to one of, the fastener system, the fuel tank system, and the current generating system comprises connecting the one or more conductive radius fillers via the one or more conductive radius filler connections comprising one of, a post-cure conductive connection, or a co-cured conductive connection.

19. The method of claim 18 wherein the step of using the one or more current handling systems, further comprises using the one or more current handling systems comprising an edge glow handling system comprising one or more redirected current pathways from one or more fasteners of the fastener system through the one or more conductive radius fillers, to handle the edge glow as the secondary effect of the one or more lightning strikes, and to provide the edge glow mitigation.

20. The method of claim 16 wherein the step of using the one or more current handling systems, further comprises using the one or more current handling systems comprising one or more redirected charge pathways from one or more fuel tank surfaces of the fuel tank system through the one or more conductive radius fillers, to provide the electrostatic discharge mitigation of the electrostatic discharge caused by the refueling electrification and the fuel slosh.

21. The method of claim 16 wherein the step of using the one or more current handling systems, further comprises using the one or more current handling systems comprising a current return handling system comprising one or more redirected current pathways from one or more electronic systems of the current generating system through the one or more conductive radius fillers, to handle the current return and to provide the minimized dedicated conductive system.

* * * * *